United States Patent
Kim

(10) Patent No.: US 11,849,306 B2
(45) Date of Patent: Dec. 19, 2023

(54) METHOD FOR PERFORMING BEAM SWEEPING BY TERMINAL SUPPORTING SIDELINK IN WIRELESS COMMUNICATION SYSTEM, AND TERMINAL THEREFOR

(71) Applicant: LG ELECTRONICS INC., Seoul (KR)

(72) Inventor: Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 520 days.

(21) Appl. No.: 17/260,476

(22) PCT Filed: Aug. 30, 2019

(86) PCT No.: PCT/KR2019/011185
§ 371 (c)(1),
(2) Date: Jan. 14, 2021

(87) PCT Pub. No.: WO2020/046062
PCT Pub. Date: Mar. 5, 2020

(65) Prior Publication Data
US 2021/0321267 A1  Oct. 14, 2021

(30) Foreign Application Priority Data
Aug. 31, 2018  (KR) .................. 10-2018-0103750

(51) Int. Cl.
H04W 16/28  (2009.01)
H04W 4/40  (2018.01)
H04W 76/28  (2018.01)
H04W 72/02  (2009.01)
H04W 76/14  (2018.01)
(Continued)

(52) U.S. Cl.
CPC ............. *H04W 16/28* (2013.01); *H04W 4/40* (2018.02); *H04W 76/28* (2018.02)

(58) Field of Classification Search
CPC ....... H04W 16/28; H04W 4/40; H04W 76/28; H04W 72/02; H04W 76/14; H04B 7/0404; H04B 7/0408
See application file for complete search history.

(56) References Cited

U.S. PATENT DOCUMENTS

2019/0181932 A1 * 6/2019 Jayawardene ...... H04W 72/046
2020/0059291 A1 * 2/2020 Kobayashi ............... H04B 7/08
(Continued)

OTHER PUBLICATIONS

ZTE, "Discussion on QoS management", 3GPP TSG RAN WG1 Meeting #94, Aug. 20-24, 2018, R1-1808608.
(Continued)

Primary Examiner — Harry H Kim
(74) Attorney, Agent, or Firm — BRYAN CAVE LEIGHTON PAISNER LLP

(57) ABSTRACT

Disclosed is a method for performing beam sweeping by a first terminal supporting sidelink in a wireless communication system. Specifically, the method may comprise the steps of: receiving, from a second terminal, a request message for an initial beam search; transmitting, to the second terminal, a response message including information on a start point of beam sweeping; and performing the beam sweeping for the second terminal on the basis of the start point of the beam sweeping.

14 Claims, 17 Drawing Sheets

(51) Int. Cl.
  *H04B 7/0404* (2017.01)
  *H04B 7/0408* (2017.01)

(56) References Cited

U.S. PATENT DOCUMENTS

| | | | | |
|---|---|---|---|---|
| 2020/0322774 | A1* | 10/2020 | Vargas | H04W 4/023 |
| 2021/0345360 | A1* | 11/2021 | Yeo | H04W 72/20 |
| 2021/0368466 | A1* | 11/2021 | Fakoorian | H04W 56/0015 |
| 2023/0199819 | A1* | 6/2023 | Fouad | H04W 72/541 |
| | | | | 370/329 |

OTHER PUBLICATIONS

Panasonic, "Discussion on resource allocation mechanism for NR sidelink", 3GPP TSG RAN WG1 Meeting #94, Aug. 20-24, 2018, R1-1808648.

Samsung, "Discussion on Synchronization Mechanism", 3GPP TSG RAN WG1 meeting #94, Aug. 20-24, 2018, R1-1808777.

Toyota Info Technology Center, "Discussion on beam management for NR-V2X sidelink in millimeter-wave bands", 3GPP TSG RAN WG1 Meeting #94, Aug. 20-24, 2018, R1-1809039.

Nokia, Nokia Shanghai Bell, "Initial View on NR V2X Sidelink Synchronization", 3GPP TSG-RAN WG1 Meeting #94, Aug. 20-24, 2018, R1-1809046.

* cited by examiner (a)

(b)

(a)

(b)

(a)

(b)

METHOD FOR PERFORMING BEAM SWEEPING BY TERMINAL SUPPORTING SIDELINK IN WIRELESS COMMUNICATION SYSTEM, AND TERMINAL THEREFOR

This application is the National Stage filing under 35 U.S.C. 371 of International Application No. PCT/KR2019/011185, filed on Aug. 30, 2019, which claims the benefit of Korean Application No. 10-2018-0103750, filed on Aug. 31, 2018, the contents of which are all hereby incorporated by reference herein in their entirety.

TECHNICAL FIELD

The present disclosure relates to a method of performing beam sweeping by a terminal supporting sidelink in a wireless communication system and terminal therefor and, more particularly, to a method for a terminal that currently performs data transmission and reception to configure a beam sweeping start point for new data transmission and reception and perform beam sweeping.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to provide a method of performing beam sweeping by a user equipment (UE) supporting sidelink in a wireless communication system. Specifically, the object of the present disclosure is to provide a method for a UE that currently performs data transmission and reception to configure a beam sweeping start point for new data transmission and reception and perform beam sweeping.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve these objects and other advantages, a method of performing beam sweeping by a first user equipment (UE) supporting sidelink in a wireless communication system is provided. The method may include: receiving from a second UE a request message for initial beam search for first data transmission; determining whether to discontinue second data transmission currently performed by the first UE based on a priority of the first data transmission and a priority of the second data transmission; transmitting to the second UE a response message including information about a start point of beam sweeping for the second UE based on whether the second data transmission is discontinued; and performing the beam sweeping for the second UE based on the start point of the beam sweeping.

When the priority of the first data transmission is higher than the priority of the second data transmission, the second data transmission may be discontinued.

When latency requirements of the first data transmission is not satisfied, the second data transmission may be discontinued.

When a link quality measurement value of the second data transmission is smaller than a threshold, the second data transmission may be discontinued.

The request message may include information about the priority of the first data transmission and information about a first start point preferred by the second UE.

When the first start point is acceptable, the first start point may be set to the start point of the beam sweeping. When the first point is unacceptable, a second start point preferred by the first UE may be set to the start point of the beam sweeping.

The response message may further include information about a pattern for performing the beam sweeping, and the beam sweeping may be performed based on the pattern.

The request message may be received in a frequency band below 6 GHz, and the second data transmission may be performed in a frequency band of 6 GHz or higher.

The first UE may have a plurality of antenna panels, and the second data transmission may be performed on a first antenna panel among the plurality of antenna panels.

The beam sweeping may be performed for candidate beams of a second antenna panel among the plurality of antenna panels, and the second antenna panel may be spatially isolated from the first antenna panel.

When reference signal received power (RSRP) of the beam sweeping for the candidate beams of the second antenna panel is smaller than a threshold, the beam sweeping may be performed for candidate beams of the first antenna panel.

The first UE may communicate with at least one of an autonomous driving vehicle, a base station, a network, or UEs other than the first UE.

Advantageous Effects

According to examples or implementations of the present disclosure, a user equipment (UE) may configure a beam sweeping start point in consideration of current data transmission and reception, thereby achieving flexible beam sweeping and improving the quality of communication.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE

Figure 1:
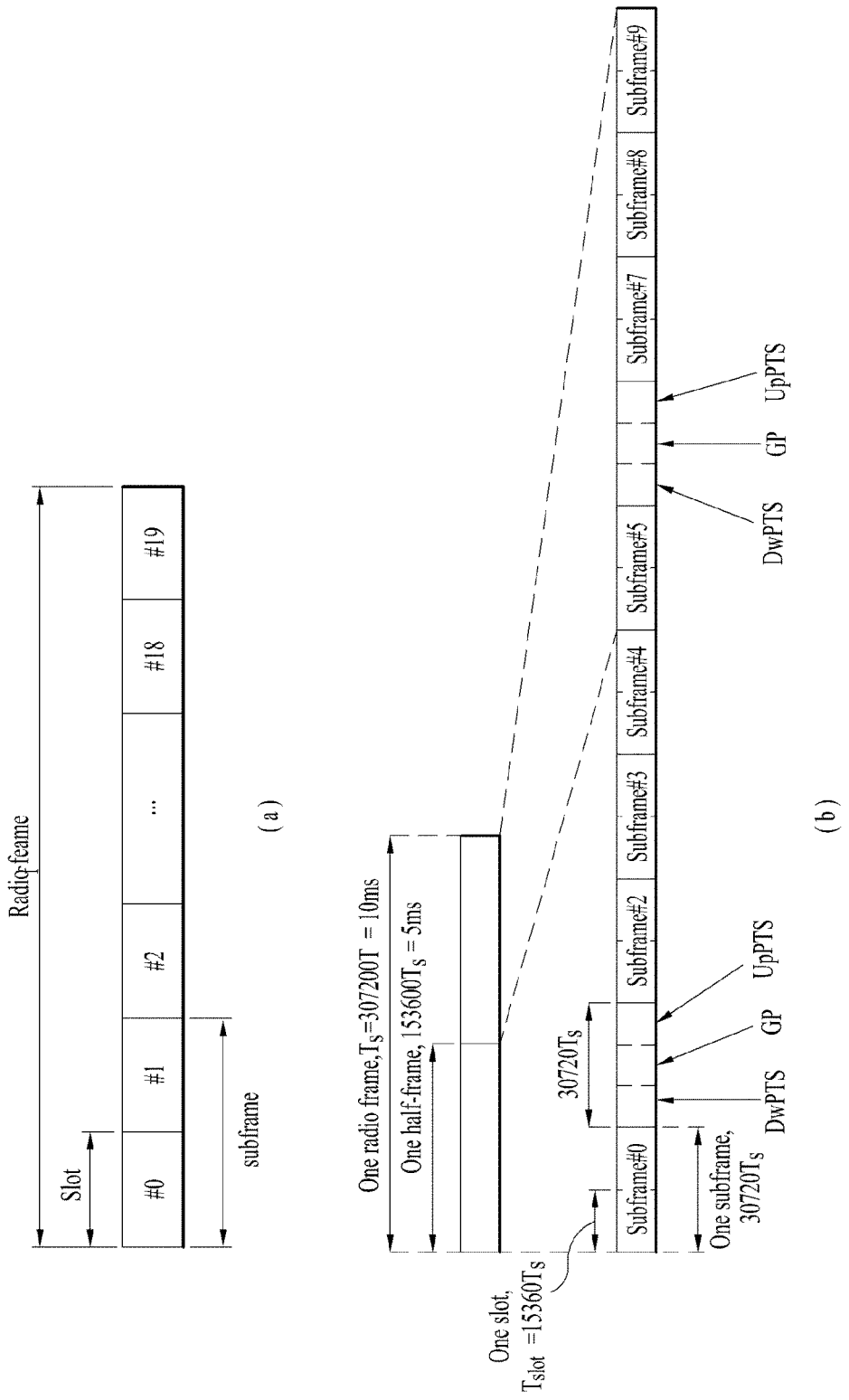
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc. The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-1-DMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

Hereinafter, multiple user cases of 5G communication systems including NR will be described.

5G is a technique for providing a stream rated at hundreds of megabits per second to gigabytes per second and may complement fiber-to-the-home (FTTH) and cable-based broadband (or DOCSIS). Such a high speed may be required to provide not only virtual reality (VR) and augmented reality (AR) but also television (TV) services with a resolution of 4K or higher (6K, 8K, or higher). VR and AR applications mostly include immersive sporting events. A specific application may require a special network configuration. For example, for a VR game, a game company may need to integrate a core server with an edge network server of a network operator in order to minimize latency.

The automotive sector is expected to be an important new driver for 5G with many use cases for vehicle mobile communication. For example, entertainment for passengers requires high-capacity and high-mobility broadband at the same time because future users expect to continue high quality of connections independently of their locations and speeds. Another use case in the automotive field is an AR dashboard. The AR dashboard identifies an object in the dark and tells a driver about the distance and movement of the object, that is, displays overlay information on top of what the driver is seeing through the front window. In the future, wireless modules enable communication between vehicles, information exchange between vehicles and supporting infrastructures, and information exchange between vehicles and other connected devices (e.g., device accompanied by pedestrians). A safety system guides alternative driving courses so that drivers may drive safely to reduce the risk of accidents. The next step would be a remote control vehicle or a self-driving vehicle, which requires exceptionally reliable and extremely fast communication between different self-driving vehicles and between vehicles and infrastructures. In the future, the self-driving vehicle will perform all driving activities, and the driver will focus only on traffic problems that the vehicle cannot autonomously identify. Technical requirements of the self-driving vehicle are ultra-low latency, ultra-high speed, and high reliability to increase traffic safety to levels that humans cannot achieve.

In a smart city and a smart home, which is called a smart society, a high-density wireless sensor network will be embedded. A distributed network of intelligent sensors will identify conditions for cost and energy-efficient maintenance of a city or house. Similar settings may be established for each home. Temperature sensors, window and heating controllers, security systems, and home appliances are all wirelessly connected. Although many of these sensors have typically low data rates, low power, and low cost, real-time high-definition video may be required in a particular type of device for monitoring.

Since consumption and distribution of energy including heat or gas is highly decentralized, automatic control of a distributed sensor network is required. A smart grid collects information and interconnects sensors using digital information and communication technology to operate the sensors based on the collected information. Such information may include supplier and consumer behavior, thus enabling the smart grid to improve the distribution of fuel such as electricity, in efficient, reliable, economical, production-sustainable, and automatic manners. The smart grid may be considered as a sensor network with low latency.

The health sector has a large number of applications that may benefit from mobile communication. Communication systems may support telemedicine, that is, provide medical care in remote areas. Telemedicine may help to reduce a distance barrier and improve access to medical services that are not continuously available in distant rural areas. Telemedicine is also used to save lives in critical treatment and emergency situations. A wireless sensor network based on mobile communication may provide remote monitoring and sensors for parameters, such as heart rate and blood pressure.

Wireless and mobile communication gradually becomes important in industrial applications. Wiring involves high costs for installation and maintenance. Thus, the possibility of replacement a cable by a reconfigurable wireless link is attractive for many industrial fields. However, to this end, a wireless connection needs to operate with similar latency, reliability, and capacity to those of a cable. In addition, the maintenance thereof also needs to be simplified. Low latency and low error probabilities are new requirements for 5G connections.

Logistics and freight tracking are important use cases for mobile communication that enables the tracking of inventory and packages wherever they are through using location based information systems. The logistics and freight use cases typically require lower data rates but need wide coverage and reliable location information.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
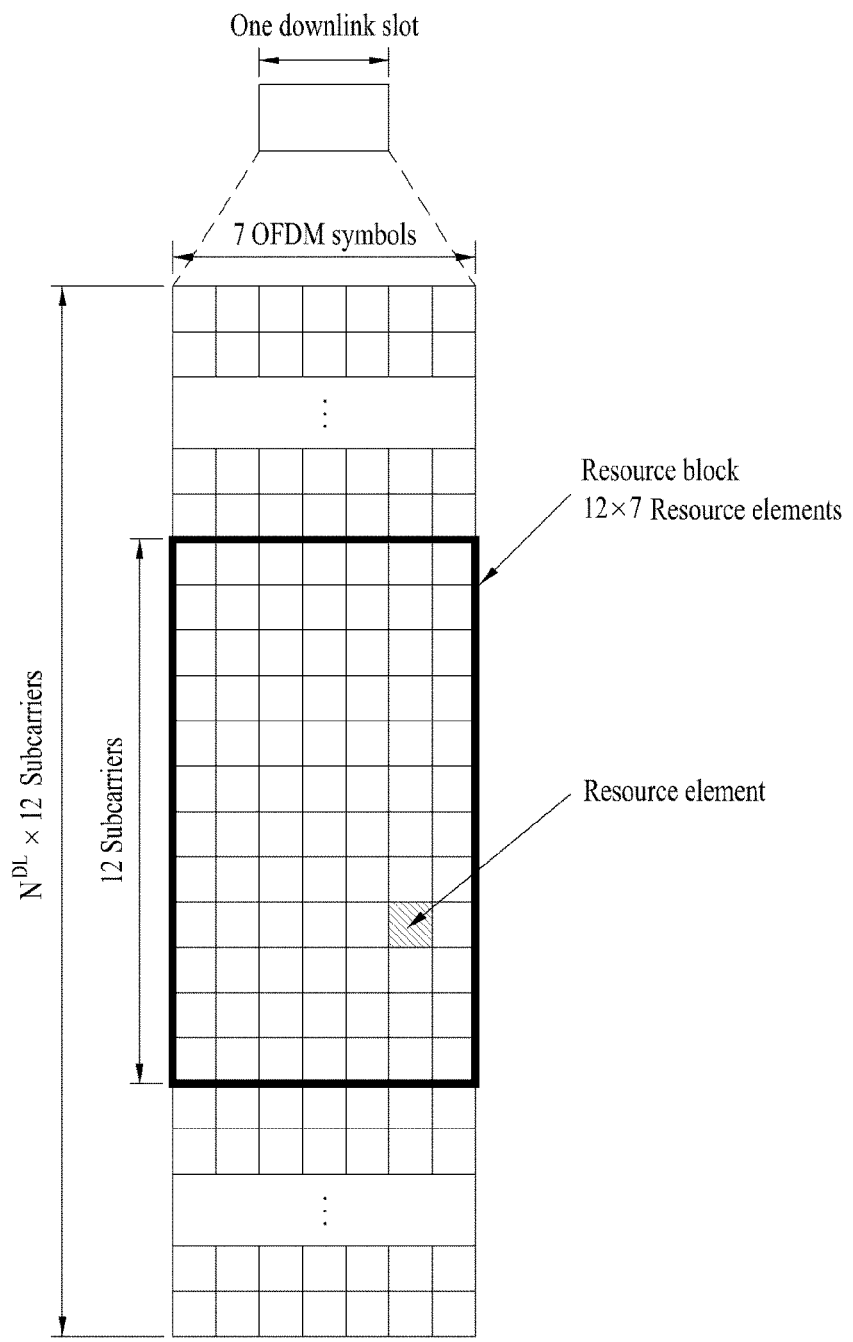
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
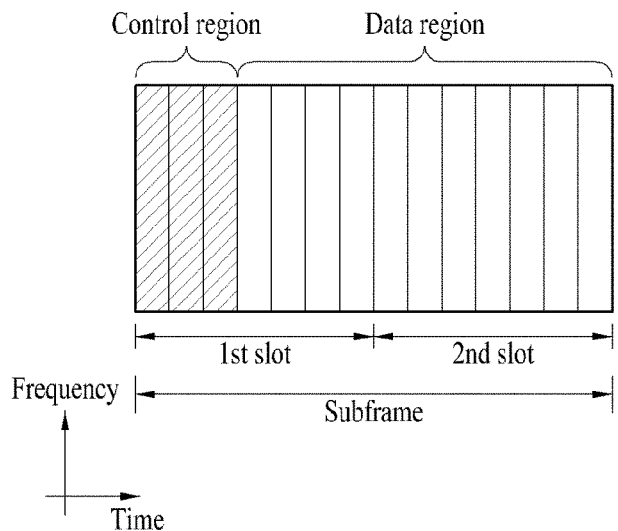
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
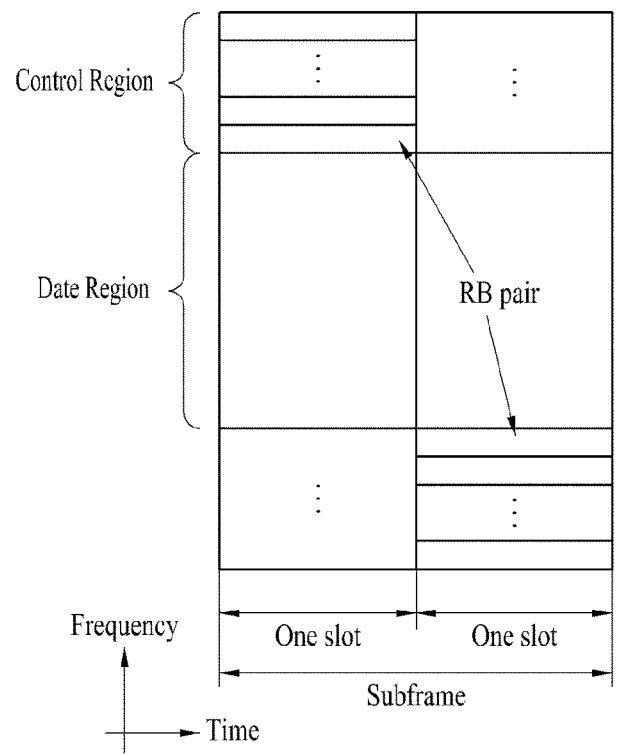
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of Multiple-Input Multiple-Output (MIMO) System

Figure 5:
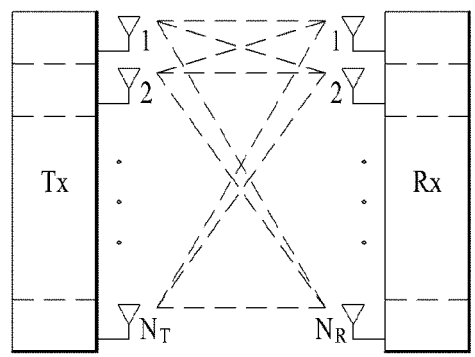
FIG. 5 is a view illustrating the configuration of a wireless communication system having multiple antennas.
Figure 5:
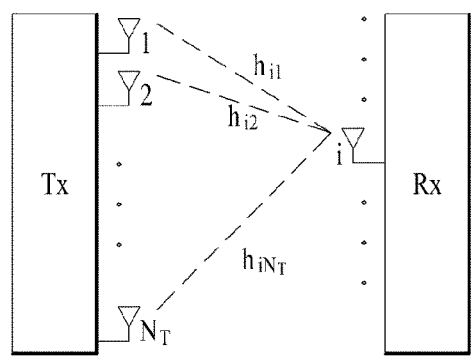

FIG. 5 is a diagram illustrating a configuration of a wireless communication system having multiple antennas.

As shown in FIG. 5(a), if the number of Tx antennas is increased to NT and the number of Rx antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained.

In order to explain a communicating method in a MIMO system in detail, mathematical modeling can be represented as follows. It is assumed that there are NT Tx antennas and NR Rx antennas.

Regarding a transmitted signal, if there are NT Tx antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $p_1, p_2, \ldots, p_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state, $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an ith Tx antenna and jth information. W is also called a precoding matrix.

If the NR Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the NT Tx antennas to the Rx antenna i. The channels may be combined and expressed in the form of a vector and a matrix. In FIG. 5(b), the channels from the NT Tx antennas to the Rx antenna i can be expressed as follows.

$$h_i^T = [h_{i1}, h_{i2}, \ldots, s_{iN_T}] \quad \text{[Equation 7]}$$

Accordingly, all channels from the NT Tx antennas to the NR Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the NR Rx antennas can be expressed as follows.

$$n=[n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_j \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ & & \ddots & \\ h_{i1} & h_{i2} & \ldots & h_{iN_T} \\ \vdots & & \ddots & \vdots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_t \\ \vdots \\ n_{N_T} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number NR of Rx antennas and the number of columns thereof is equal to the number NT of Tx antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank (H) of the channel matrix His restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme.

Figure 6:
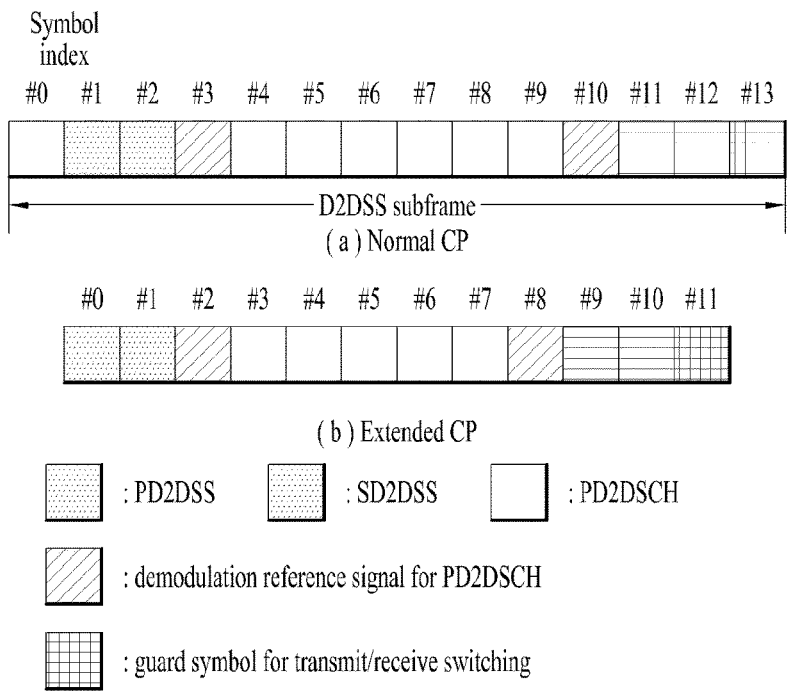
FIG. 6 is a view illustrating a subframe carrying a device-to-device (D2D) synchronization signal.

FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
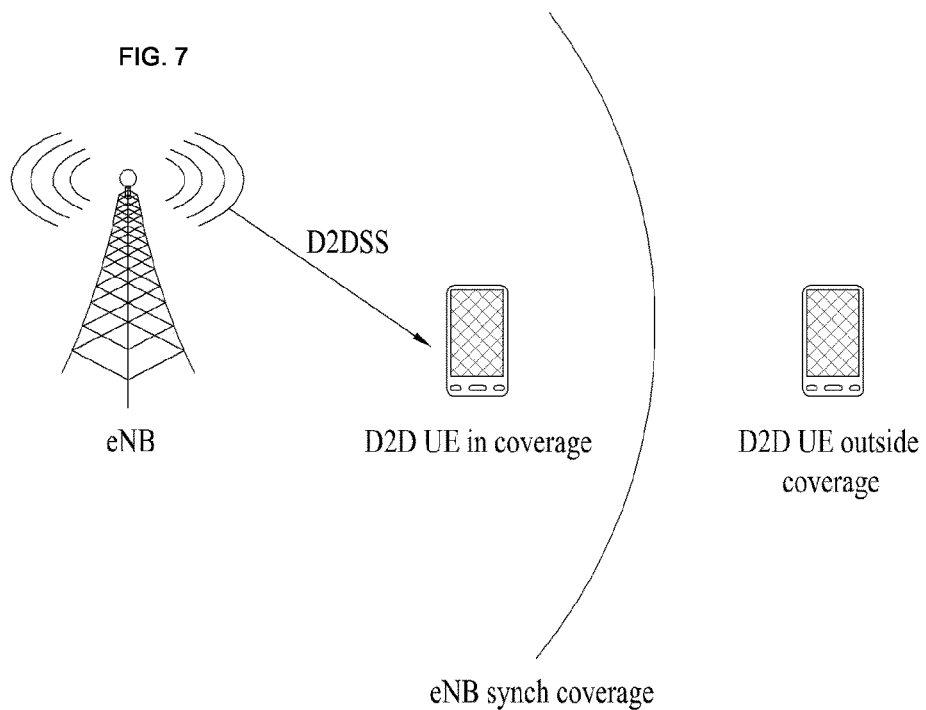
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
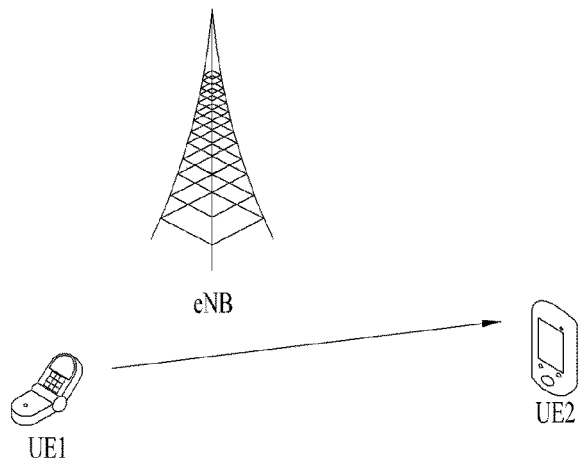
FIG. 8 is a view illustrating an exemplary D2D resource pool for D2D communication.
Figure 8:
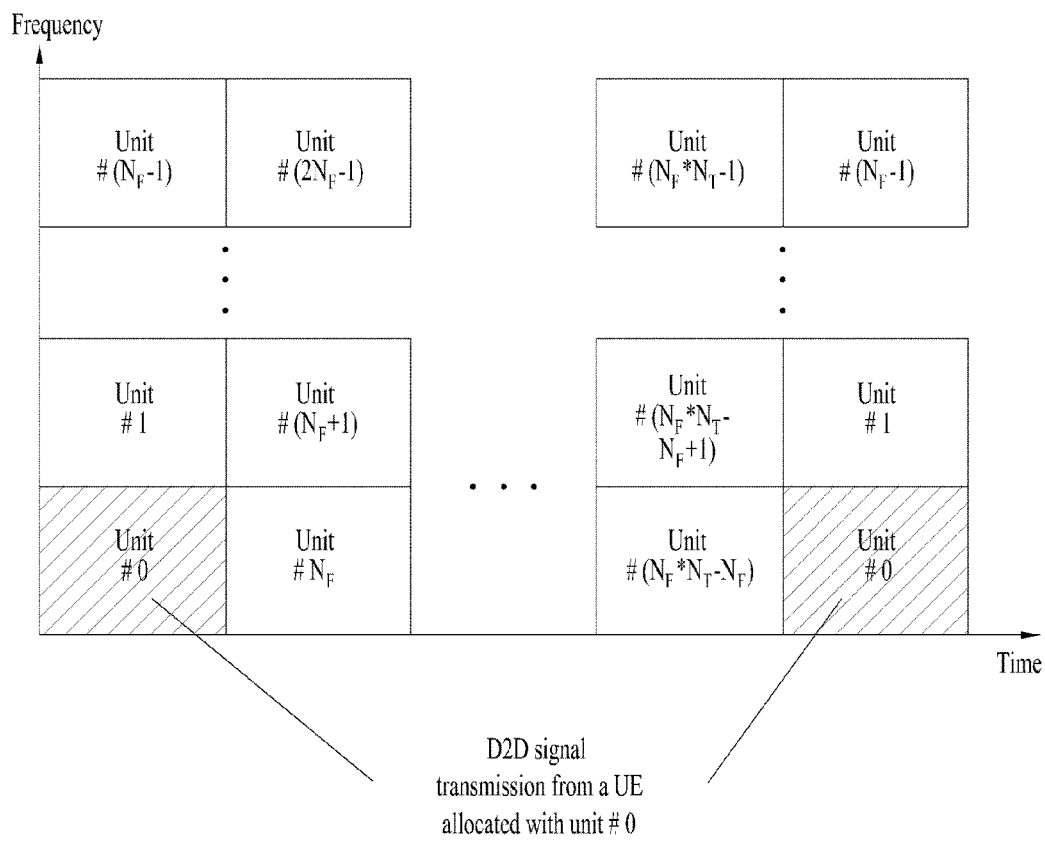

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a Rx UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the NF number of resource units and the entire time resources are divided into the NT number of resource units. In particular, it is able to define NF*NT number of resource units in total. In particular, a resource pool can be repeated with a period of NT subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a Tx UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover Tx UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual Tx UE or the individual Tx UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D Tx UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
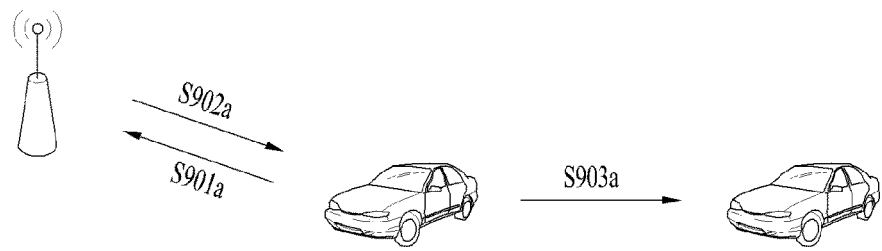
FIG. 9 is a view referred to for describing transmission modes and scheduling schemes for vehicle-to-everything (V2X)
Figure 9:
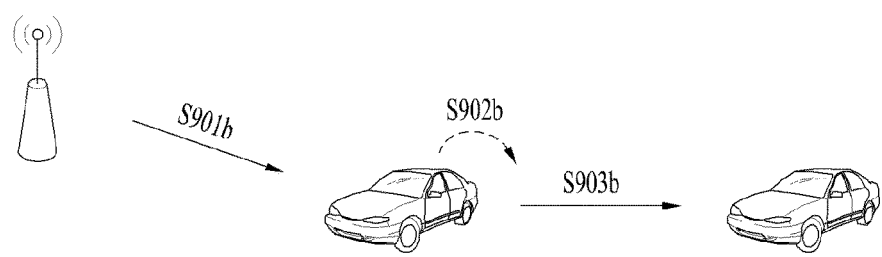
Figure 10:
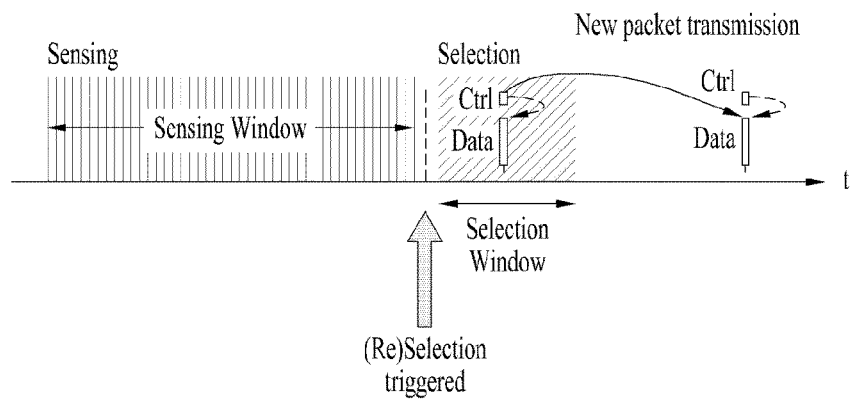
FIG. 10 is a view illustrating a method of selecting resources in V2X.
Figure 11:
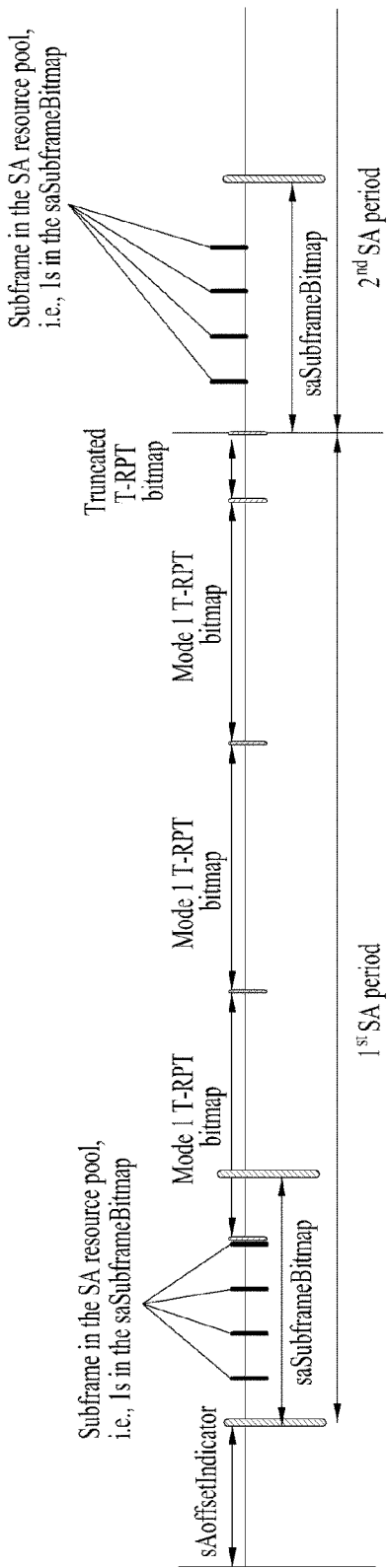
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A Tx UE performs transmission at T-RPT positions corresponding to 1s in a T-RPT bitmap, and one MAC PDU is transmitted four times.

Figure 12:
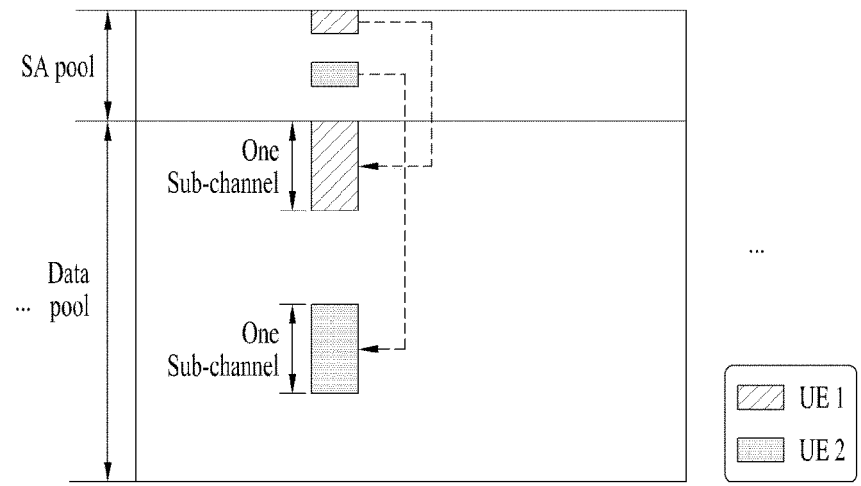
FIG. 12 is a view referred to for describing an SA and data transmission in V2X.
Figure 12:
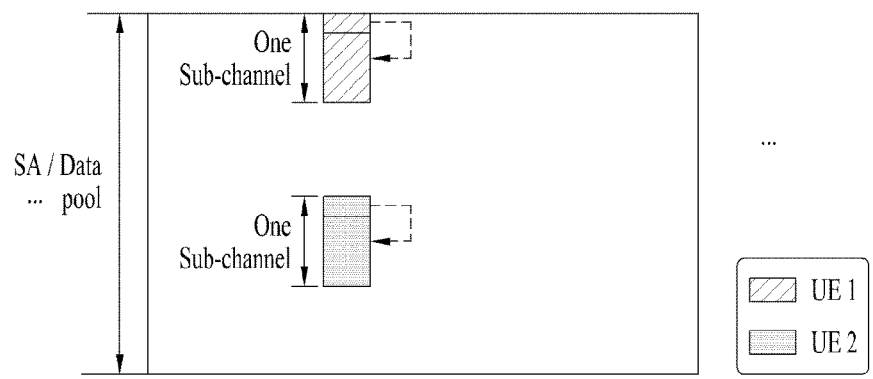

Unlike D2D, an SA (PSCCH) and data (PSSCH) are transmitted in FUM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
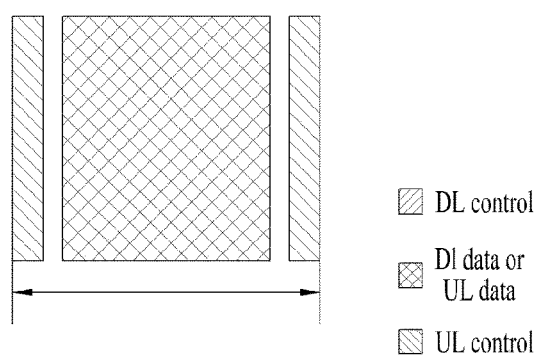
FIGS. 13 and 14 are views illustrating a new radio access technology (new RAT or NR) frame structure.
Figure 14:
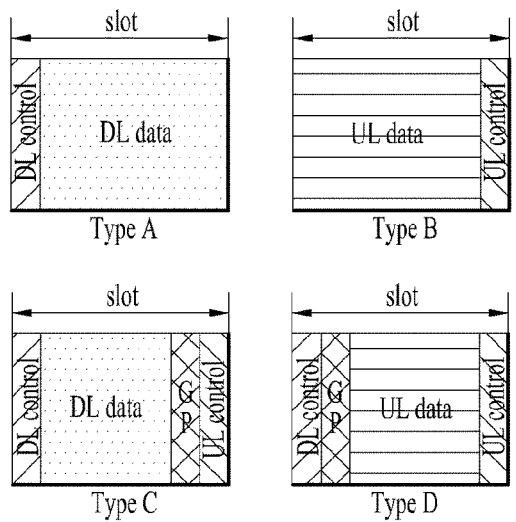

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Analog Beamforming and Beam Management

In the NR system, a massive MIMO environment where a number of Tx/Rx antennas are used may be considered. In the massive MIMO environment, there may be tens or hundreds of Tx/Rx antennas or more. In addition, the NR system supports communication in frequency bands above 6 GHz, i.e., communication in millimeter frequency bands. However, in the millimeter frequency band, signal attenuation may sharply increase depending on distance due to the use of such an extremely high frequency band. Thus, the NR system using bands at least above 6 GHz uses a beamforming scheme where a signal is transmitted in a specific direction based on energy collection rather than omni-directionally in order to compensate for such significant propagation attenuation.

In particular, if a number of antennas are required as in the millimeter frequency band, the use of analog beamforming or hybrid beamforming is considered. In the analog beamforming, multiple antenna elements are mapped to one transceiver unit (TXRU), and the direction of a beam is adjusted by an analog phase shifter.

To maximize the performance gain of the massive MIMO, each antenna element may have a TXRU such that the adjustment of transmit power and phases per antenna element is enabled. By doing so, independent beamforming may be performed per frequency resource. However, installing the TXRU in each antenna element is less feasible in practical terms.

Therefore, a method of mapping a plurality of antenna elements to one TXRU and adjusting the direction of a beam using an analog phase shifter has been considered in the NR system. In the case of an analog beam, there is a limitation that only one beam direction is capable of being formed for each time instance (e.g., symbol, subframe, etc.), and there is a disadvantage that the performance may be significantly degraded when Tx/Rx beam pairing is inaccurate.

Figure 15:
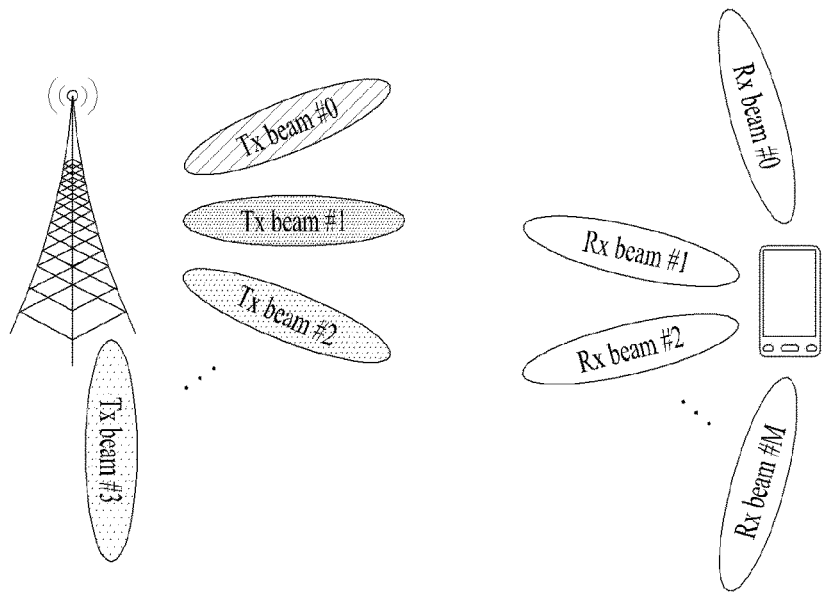
FIG. 15 is a diagram for explaining the configuration of a pair of transmission and reception beams between a user equipment (UE) and a base station (BS) according to an example or implementation of the present disclosure.

FIG. 15 is a diagram for explaining the configuration of a Tx/Rx beam pair between a UE and a BS (eNB or gNB). It is assumed that the BS configures N Tx (analog) beams and the UE configures M Rx (analog) beams. If the UE receives signals with beam pairs consisting of Tx beam #1 and Rx beam #1 and Tx beam #2 and Rx beam #2, the reception performance may be optimized. In this case, if the UE receives the signal transmitted on Tx beam #2 on other Rx beams except Rx beam #2, which is paired with Tx beam #2, the reception performance of the UE may be degraded.

Beam Sweeping for Vehicle Communication

A UE's request (or triggering) message for performing new Tx/Rx beam acquisition may be transmitted in a frequency band below 6 GHz because there are coverage issues and it is difficult to determine a beamforming direction for the message.

A request procedure for Tx/Rx beam acquisition may include not only a request procedure for initial beam search (or beam acquisition) for new data transmission and reception but also a request procedure for new beam search, which is necessary when a Tx/Rx beam pair is mismatched during current data transmission and reception. In other words, the UE may transmit a request message for new beam search when beam recovery is required due to the occurrence of beam or link failure during the current data transmission and reception or when beam change such as reselection, adjustment, and refinement is required during the current data transmission and reception. In this case, the beam search procedure may include the following procedures: a beam sweeping procedure, a link measurement procedure, a reporting procedure, etc.

For convenience of description, it is assumed that the request message for initial beam search for new data transmission and reception is transmitted in a frequency band below 6 GHz. However, the present disclosure is not limited thereto. That is, the present disclosure is applicable when request messages for other beam search procedures except the initial beam search procedure are transmitted on resources besides the frequency band below 6 GHz. For example, the other beam search procedures may include a beam search procedure for beam discovery when beam or link failure occurs or a beam search procedure for beam change when reselection, adjustment, and refinement are required. For example, a resource for transmitting the request message may be determined based on a specific carrier, a bandwidth (part), a resource pool, or a channel In this case, the resource for transmitting the request message may be a frequency band above or below 6 GHz, and more particularly, a resource where coverage issues or beamforming direction determination issues are less likely to occur may be selected as the resource.

When the UE performs beam sweeping, the UE may not transmit and receive any data in a frequency band where the UE performs the beam sweeping. For example, when the UE performs the beam sweeping in a millimeter wave (mmWave) band above 6 GHz, the UE may not transmit and receive any data in the corresponding mmWave band. Thus, when the request message for initial beam search is received from the UE, the start point (or duration) of the beam sweeping may need to be determined in consideration of data transmission and reception. For example, when the request message is received, it may need to be determined whether some or all UEs should perform the beam sweeping at a predetermined specific time point or after lapse of a predetermined or signaled specific time from the time when the request message is received, regardless of which operations the UEs currently perform.

In addition to the start point of the beam sweeping, the direction (pattern) of the beam sweeping may also need to be determined. The direction (pattern) of the beam sweeping may refer to either or both the starting direction of the beam sweeping and the execution direction of the beam sweeping. For example, when the request message is received, it may need to be determined whether some or all UEs should perform the beam sweeping based on either or both the starting and execution directions of the beam sweeping.

The starting direction of the beam sweeping may be represented by one of the cardinal points: north, south, east, and west with respect to a fixed reference point. The execution direction of the beam sweeping may be represented by either the clockwise or counterclockwise direction with respect to the fixed reference point. The starting or execution direction of the beam sweeping may be represented by an absolute direction, and in this case, the fixed reference point may be predetermined. For example, the reference point may be predetermined as follows: the 12 o'clock position is 0°. Then, the starting and execution directions may be represented by 90°, 180°, or 270° and the clockwise or counterclockwise direction with respect to the reference point, respectively. Alternatively, the starting or execution direction of the beam sweeping may be represented by a relative direction, and in this case, a previous beam direction of the UE may be set to the fixed reference point. The starting or execution direction of the beam sweeping is not limited to the above example. That is, the starting or execution direction of the beam sweeping may be indicated in various ways.

Figure 16:
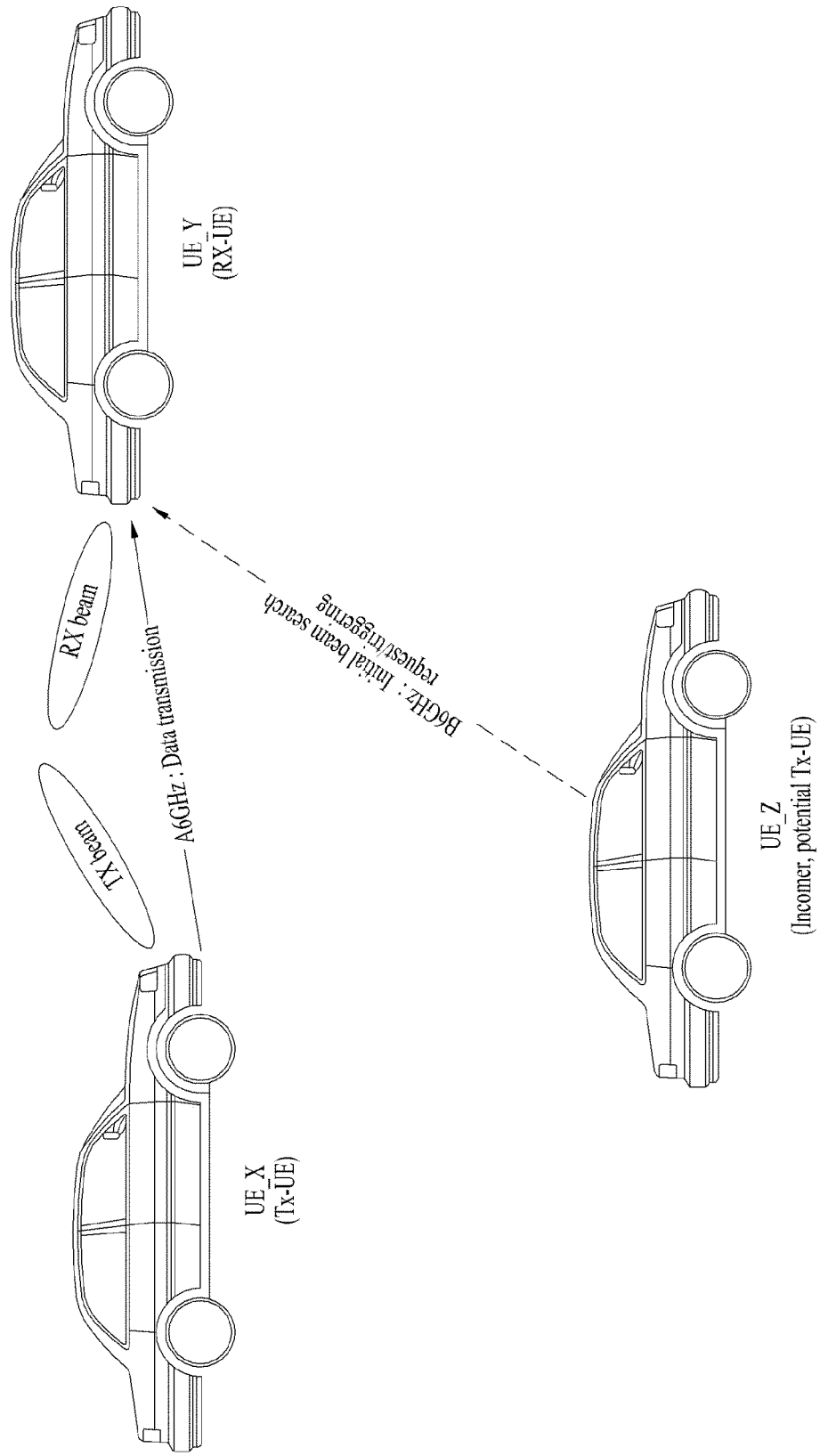
FIGS. 16 and 17 are diagrams for explaining embodiments in which a UE receives a request message for initial beam search for Tx/Rx beam acquisition.
Figure 17:
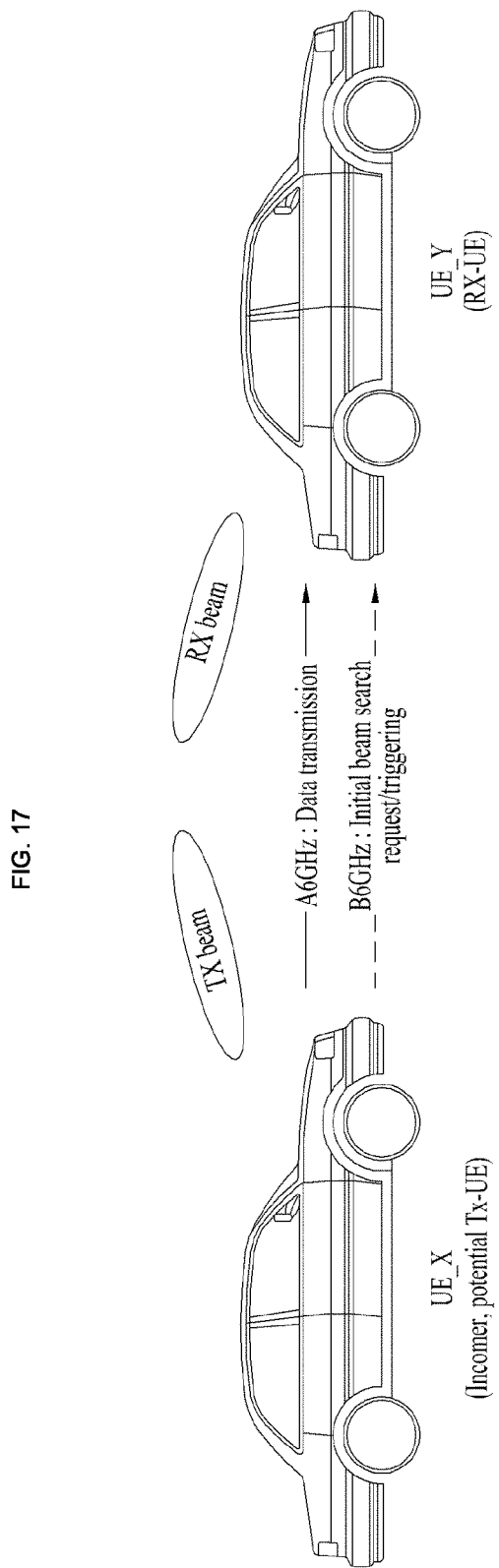

FIGS. 16 and 17 are diagrams for explaining embodiments in which a UE receives a request message for initial beam search for Tx/Rx beam acquisition. Specifically, FIG. 16 shows a case in which while a Rx UE, UE_Y exchanges data with a Tx UE, UE_X after discovering a Tx/Rx beam pair and establishing a link therebetween in a mmWave band, UE_Y receives a request message for initial beam search for Tx/Rx beam acquisition from another Tx UE, UE_Z through signaling in a frequency band below 6 GHz. FIG. 17 shows a case in which while a Rx UE, UE_Y exchanges data with a Tx UE, UE_X after discovering a Tx/Rx beam pair and establishing a link therebetween in a mmWave band, UE_Y receives a request message for initial beam search for Tx/Rx beam acquisition from UE_X.

In FIGS. 16 and 17, the Rx UE, UE_Y receives a request message for potential data transmission and reception from a current peer UE, UE_X or from UE_Z which is not the current peer UE during data exchange with the peer UE. Specifically, in FIG. 16, while the Rx UE, UE_Y exchanges data with a specific Tx UE in an environment in which there are multiple pairs of Tx and Rx UEs, the Rx UE, UE_Y receives a request message for beam search for potential data transmission and reception with a new Tx UE, which is not the current peer UE. From the perspective of the Rx UE, UE_Y, data exchanged or to be exchanged with the two Tx UEs may be equal to or different from each other. In FIG. 17, the Rx UE, UE_Y receives from the current peer UE a request message for beam search for additional data transmission and reception other than current data transmission and reception in an environment in which there is one pair of Tx and Rx UEs.

Upon receiving the request message, the Rx UE, UE_Y may need to determine the start point of beam sweeping for initial beam search. Alternatively, UE_Y may need to determine the starting or execution direction of the beam sweeping together with the start point. Further, UE_Y may also need to determine whether to stop or terminate the current data transmission and reception. To this end, standards for the Rx UE, UE_Y to stop or terminate the current data transmission and reception needs to be discussed.

In examples or implementations of the present disclosure, Tx/Rx beam sweeping methods when a UE supporting sidelink receives an initial beam search request for Tx/Rx beam acquisition during data transmission and reception are provided. Although the proposed methods are described based on unicast scenarios for convenience of description, the proposed methods are applicable to multicast/groupcast/broadcast scenarios. In addition, although the proposed methods are described based on V2V scenarios, the present disclosure is not limited thereto. That is, the proposed methods are applicable to network-to-UE communication. The proposed methods may be implemented independently, and some of the proposed methods may be combined (or merged) for implementation thereof.

The UE may form one or multiple beams at a specific time. It may also be considered that the UE has a plurality of distributed antenna panels. In addition, the UE may transmit and receive the same or different information using one or multiple antenna panels at a specific time. For a single UE, time division multiplexing (TDM) or frequency division multiplexing (FDM) may be performed between a frequency band below 6 GHz and a frequency band above 6 GHz. Thus, the UE may transmit and receive specific data in the frequency band below 6 GHz and, at the same time, transmit and receive other data in the frequency band above 6 GHz.

Method 1. Method of Performing Beam Sweeping at Previously Signaled Point

When an Rx UE exchanges data with a Tx UE as shown in FIG. 16, the Rx UE may receive a request message for initial beam search for Tx/Rx beam acquisition from a potential Tx UE. The request message for initial beam search may be a request message for beam search for new data transmission and reception.

The Rx UE may perform beam sweeping at a predetermined or signaled point when receiving the request message for initial beam search. The corresponding beam sweeping start point may be predetermined or signaled between the Rx and Tx UEs performing the data transmission and reception, or it may be predetermined or signaled between all UEs in a specific region or coverage area. If a plurality of beam sweeping start points are predetermined or signaled, the Rx UE may perform the beam sweeping at the earliest beam sweeping start point or at a beam sweeping start point preferred or autonomously determined by the Rx UE. In this case, since current data transmission and reception of the Rx UE is performed in consideration of the beam sweeping point, the current data transmission and reception may not be stopped or terminated in this method.

For example, the request message for initial beam search transmitted from the potential Tx UE may include information about a beam sweeping start point preferred by the potential Tx UE. If the point preferred by the potential Tx UE is quite similar to a common beam sweeping start point, the preferred point may be accepted by the Rx UE. In this case, the Rx UE may transmit an acceptance message for the preferred point as a response message. On the other hand, when the point preferred by the potential Tx UE is unacceptable, the Rx UE may transmit a rejection message for the preferred point as a response message. When the Rx UE transmits the rejection message for the preferred point of the potential Tx UE, the rejection message may include information about the beam sweeping start point preferred by the Rx UE or the predetermined beam sweeping start point.

In this case, if the starting or execution direction of the beam sweeping is predetermined or signaled, the Rx UE may perform the beam sweeping by considering not only the predetermined or signaled start point but also the corresponding direction. That is, some or all UEs in coverage may start the beam sweeping based on either or both the starting and execution directions. For example, the starting direction of the beam sweeping may be represented by one of the cardinal points: north, south, east, and west. The execution direction of the beam sweeping may be represented by either the clockwise or counterclockwise direction. The starting or execution direction of the beam sweeping is not limited to the above example. That is, the starting or execution direction of the beam sweeping may be indicated in various ways.

The starting or execution direction and/or beamwidth of the beam sweeping may be predetermined by in-coverage UEs, preconfigured by a network, or indicated by physical layer and/or higher layer signaling. When a plurality of starting or execution directions are predetermined or signaled, the Rx UE may autonomously determine a starting or execution direction and then perform the beam sweeping based on the autonomously determined starting or execution direction. Further, the request message for initial beam search transmitted from the potential Tx UE may include not only the information about the beam sweeping start point preferred by the potential Tx UE but also information about a beam sweeping starting or execution direction preferred by the potential Tx UE.

The Rx UE may configure common (zone-based) beam sweeping timing synchronization and a common (zone-based) direction (pattern) for a plurality of Tx UEs in specific coverage and perform the beam sweeping for the plurality of Tx UEs based on the configured beam sweeping timing synchronization and direction. In this case, the configuration of the timing synchronization and direction may not be determined only by the coverage. That is, the configuration may depend on not only the coverage but also bandwidths or carriers.

Before the beam sweeping, the Rx UE may transmit information about the common beam sweeping timing synchronization and direction to the potential Tx UE in a response message. The potential Tx UE may perform the beam sweeping based on the received information. By performing the beam sweeping, the UEs may maintain a beam pair generated for the current data transmission and reception, replace the beam pair generated for the current data transmission and reception by another beam pair, or select a new beam pair for new data transmission and reception at the same time point.

When there is one Tx UE as shown in FIG. 17, an Rx UE may receive a request message for initial beam search for Tx/Rx beam acquisition from the Tx UE. The request message for initial beam search may be a request message for beam search for new data transmission and reception. In this case, the Tx UE currently performing data transmission and reception may also act as a potential Tx UE that attempts new data transmission and reception.

Upon receiving the request message for initial beam search, the Rx UE may perform beam sweeping at a predetermined or signaled point. The beam sweeping start point may be predetermined or signaled between the Rx and Tx UEs. If a plurality of beam sweeping start points are predetermined or signaled, the Rx UE may perform the beam sweeping at the earliest beam sweeping start point or at a beam sweeping start point preferred or autonomously determined by the Rx UE. In this case, since the current data transmission and reception of the Rx UE is performed in consideration of the beam sweeping point, the current data transmission and reception may not be stopped or terminated in this method.

In this case, if the starting or execution direction of the beam sweeping is predetermined or signaled, the Rx UE may perform the beam sweeping based on the corresponding starting or execution direction. The pattern (direction) and/or beamwidth of the beam sweeping may be predetermined by in-coverage UEs, preconfigured by a network, or indicated by physical layer and/or higher layer signaling. When a plurality of starting or execution directions are predetermined or signaled, the Rx UE may autonomously determine a starting or execution direction and then perform the beam sweeping based on the autonomously determined starting or execution direction.

Since the Rx UE exchange multiple data with one UE, the Rx UE may not need to configure common beam sweeping timing synchronization and a common beam sweeping direction (pattern) for a plurality of Tx UEs. When the Rx UE receives the request message for beam search for new data transmission and reception while exchanging data with the Tx UE, the Rx UE may transmit information about its next beam sweeping start point in response to the request message. The Tx UE may perform the beam sweeping based on the received beam sweeping start point related information. The Rx and Tx UEs perform the following operations at the predetermined beam sweeping start point: maintaining a beam pair generated for the current data transmission and reception, or replacing the beam pair generated for the current data transmission and reception by another beam pair.

Figure 18:
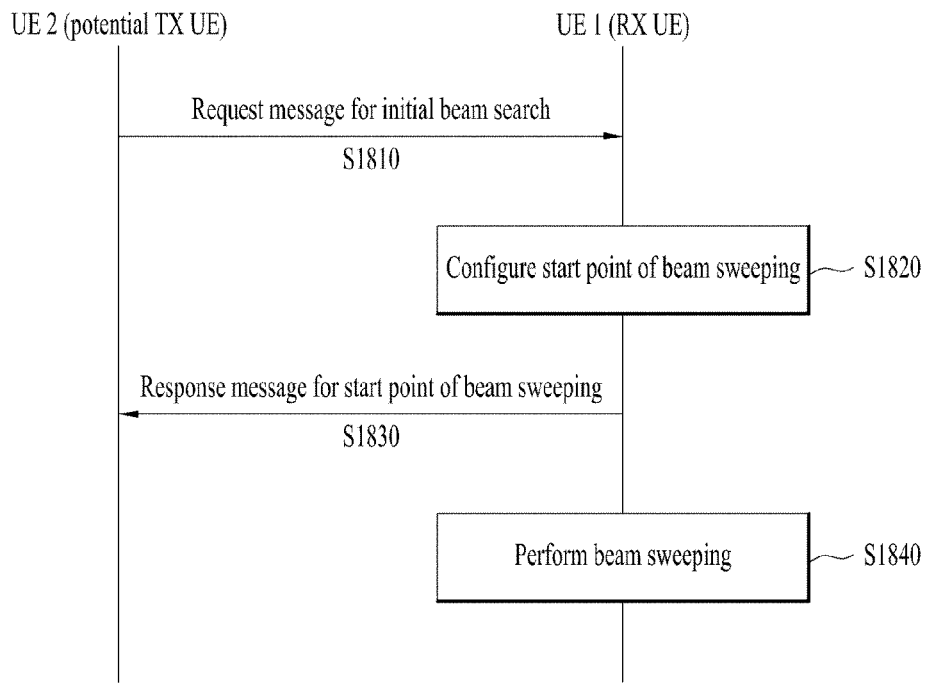
FIGS. 18 to 20 are flowcharts for explaining beam sweeping operations of a UE according to examples or implementations of the present disclosure.

FIG. 18 is a flowchart for explaining a beam sweeping operation according to Method 1. A first UE (Rx UE) receives a request message for initial beam search for Tx/Rx beam acquisition from a second UE (potential Tx UE) while performing data transmission and reception (S1810). In this case, the request message may include information about a beam sweeping start point preferred by the second UE. Upon receiving the request message, the first UE determines whether the beam sweeping start point preferred by the second UE is acceptable. If acceptable, the first UE sets the point preferred by the second UE to a beam sweeping start point. If unacceptable, the first UE sets a point preferred by the first UE or a point suitable for new data transmission and reception to the beam sweeping start point (S1820). Here, the point preferred by the first or second UE or a point considered by the second UE to be suitable for the new data transmission and reception may be one of multiple predetermined or signaled points. After determining the beam sweeping start point, the first UE transmits information about the beam sweeping start point to the second UE as a response message (S1830) and then perform beam sweeping at the corresponding point (S1840).

According to Method 1, since the Rx UE may form a new beam pair based on a predetermined or signaled beam sweeping start point, no complicate design process are required, thereby reducing overhead. If a new beam sweeping start point is configured whenever a new request message is received, beam sweeping may be extremely frequently performed for each link depending on the number of request messages. However, Method 1 may prevent the above problem.

The potential Tx UE that attempts formation of the new beam pair may not transmit and receive data until the predetermined or signaled beam sweeping start point. There may be no significant problems if the priority of the data transmitted and received by the potential Tx UE is low or the latency requirements of the data are not tight. However, if the data has high importance or tight latency requirements, this may prevent the transmission of the data having the high importance or tight latency requirements. In addition, if the Rx UE maintains the beam pair using only a part of its multiple antenna panels or based on a part of multiple candidate beam groups, the Rx UE may perform restrictive beam sweeping for the potential Tx UE using an unused antenna panel or candidate beam group. However, this method does not guarantee the flexibility of initiating the beam sweeping operation for each antenna panel or beam group because for unused antenna panels or candidate beam groups, the beam sweeping is performed only at the predetermined or signaled beam sweeping start point. The unused antenna panel or candidate beam group may mean an antenna panel or candidate beam group that is not currently used, an antenna panel or candidate beam group that is not used for the current data transmission and reception, or an antenna panel or candidate beam group that is unrelated to the current data transmission and reception even though the antenna panel or candidate beam group is involved with the beam sweeping operation.

To solve the above problem, it may be considered regarding Method 1 that the Rx UE performs the beam sweeping at a point where the current data transmission and reception, which has been performed in a frequency band above 6 GHz, is no longer preformed even until the predetermined or signaled beam sweeping start point.

The predetermined or signaled beam sweeping start point may be the next-earliest beam sweeping starting point or the beam sweeping start point autonomously determined by the UE. Further, a point where there is no data transmission and reception may refer to a transmission time interval (TTI) where there is no data transmission and reception.

Method 2. Method of Performing Beam Sweeping after Stopping or Terminating Current Data Transmission and Reception when Specific Condition is Satisfied When an Rx UE exchanges data with a Tx UE as shown in FIG. 16, the Rx UE may receive a request message for initial beam search for Tx/Rx beam acquisition from a potential Tx UE. The request message for initial beam search may be a request message for beam search for new data transmission and reception.

Upon receiving the request message for initial beam search, the Rx UE may stop or terminate current data transmission and reception under specific conditions and then perform beam sweeping.

For example, the Rx UE may compare the priority of a service or data packet to be newly transmitted and received and the priority of a service or data packet that is currently transmitted and received in order to determine whether to perform the beam sweeping. When the priority of the service or data packet to be newly transmitted and received is higher than the priority of the currently transmitted and received service or data packet, the Rx UE may stop or terminate the current data transmission and reception and then perform the beam sweeping. On the contrary, when the priority of the service or data packet to be newly transmitted and received is lower than the priority of the currently transmitted and received service or data packet, the Rx UE may not stop or terminate the current data transmission and reception. Also, the Rx UE may not perform the beam sweeping as well.

For the priority determination by the Rx UE, information about the ProSe per packet priority (PPPP) of a service or data packet that the potential Tx UE intends to transmit may be included in the request message for initial beam search transmitted from the potential Tx UE, and transmitted to the Rx UE. The information about the PPPP may be one type of information for transmitting priority information to the Rx UE. Alternatively, information about the PPPP of services or data packets exchanged or to be exchanged by the potential Tx UE may be signaled to the UEs in advance in a unicast/multicast setup or discovery procedure between the UEs.

For example, even though the Rx UE selects the earliest beam sweeping start point, which is previously determined or signaled, the latency requirements of the service or data packet to be newly transmitted and received may not be satisfied. In this case, the Rx UE may stop or terminate the current data transmission and reception by considering the importance of the latency requirements and then newly perform the beam sweeping. In this case, the beam search request message transmitted from the potential Tx UE may include information about the latency requirements of the service or data packet to be newly transmitted and received. Alternatively, information about the latency requirements of the services or data packets to be exchanged by the potential Tx UE may be signaled to the Rx UE and potential Tx UE in advance in a unicast/multicast setup or discovery procedure between the Rx UE and potential Tx UE. The information about the latency requirements may be transmitted together with the above-described PPPP information.

For example, the Rx UE may measure the link quality of a beam pair formed for the current data transmission and reception. When the measured link quality is less than a predetermined or signaled specific threshold, the Rx UE may stop and terminate the current data transmission and reception and perform the beam sweeping for a plurality of Tx UEs. Alternatively, when it is expected that the link quality of the beam pair formed for the current data transmission and reception will be degraded, the Rx UE may stop and terminate the current data transmission and reception and perform the beam sweeping for a plurality of Tx UEs. The link quality may be measured based on reference signal received power (RSRP) or signal-to-noise ratio (SNR).

The Rx UE may transmit a message indicating that the data transmission and reception over the current link will be stopped and/or a message containing information about a next beam sweeping start point to the Tx UE performing the data transmission and reception. The Tx UE may recognize the corresponding message as a request message for initial beam search from the Rx UE or a request message for resource reselection for the currently transmitted and received data. In this case, resources to be reselected may include time resources, frequency resources, beams, or spatial resources. Upon receiving the message indicating that the data transmission and reception over the current link will be stopped and/or the message containing the information about the next beam sweeping start point from the Rx UE, the Tx UE may newly perform the beam sweeping at the next beam sweeping start point. When a beam pair is generated by the newly performed beam sweeping, the Rx and Tx UEs may resume transmission of a service or data packet which has been stopped. Alternatively, the Rx and Tx UEs may drop the stopped service or data packet and then newly start the transmission of the corresponding service or data packet.

The Rx UE may transmit a response message containing the information indicating that the current data transmission and reception will be stopped and/or the information about the next beam sweeping start point to the potential Tx UE. Upon receiving the message, the potential Tx UE may perform the beam sweeping at the next beam sweeping start point and then exchange a new service or data packet with the Rx UE using a formed beam pair.

If the starting or execution direction of the next beam sweeping is determined, the Rx UE may transmit information about the starting or execution direction to the Tx UE, which currently exchanges data with the Rx UE, or the potential Tx UE when transmitting the information about the next beam sweeping start point. For example, the starting direction of the beam sweeping may be represented by one of the cardinal points: north, south, east, and west. The execution direction of the beam sweeping may be represented by either the clockwise or counterclockwise direction. The starting or execution direction of the beam sweeping may be indicated in various ways. In this case, the Tx UE or the potential Tx UE may perform the beam sweeping at a specific point in a specific starting or execution direction based on the information about the next beam sweeping start point and the information about the starting or execution direction of the beam sweeping.

When there is one Tx UE as shown in FIG. 17, an Rx UE may receive a request message for initial beam search for Tx/Rx beam acquisition from the Tx UE. The request message for initial beam search may be a request message for beam search for new data transmission and reception. In this case, the Tx UE currently performing data transmission and reception may also act as a potential Tx UE that attempts new data transmission and reception.

Upon receiving the request message for initial beam search, the Rx UE may stop or terminate the current data transmission and reception under specific conditions and then perform beam sweeping. Since the Rx UE exchanges multiple data with one UE, the Rx UE may not compare priorities of a plurality of Tx UEs to determine whether to perform the beam sweeping. That is, for one Tx UE, the Rx UE may compare the priority of a service or data packet to be newly transmitted and received and the priority of a service or data packet that is currently transmitted and received in order to determine whether to perform the beam sweeping. When the priority of the service or data packet to be newly transmitted and received is higher than the priority of the currently transmitted and received service or data packet, the Rx UE may stop or terminate the current data transmission and reception and then perform the beam sweeping. On the contrary, when the priority of the service or data packet to be newly transmitted and received is lower than the priority of the currently transmitted and received service or data packet, the Rx UE may not stop or terminate the current data transmission and reception. Also, the Rx UE may not perform the beam sweeping as well.

Figure 19:
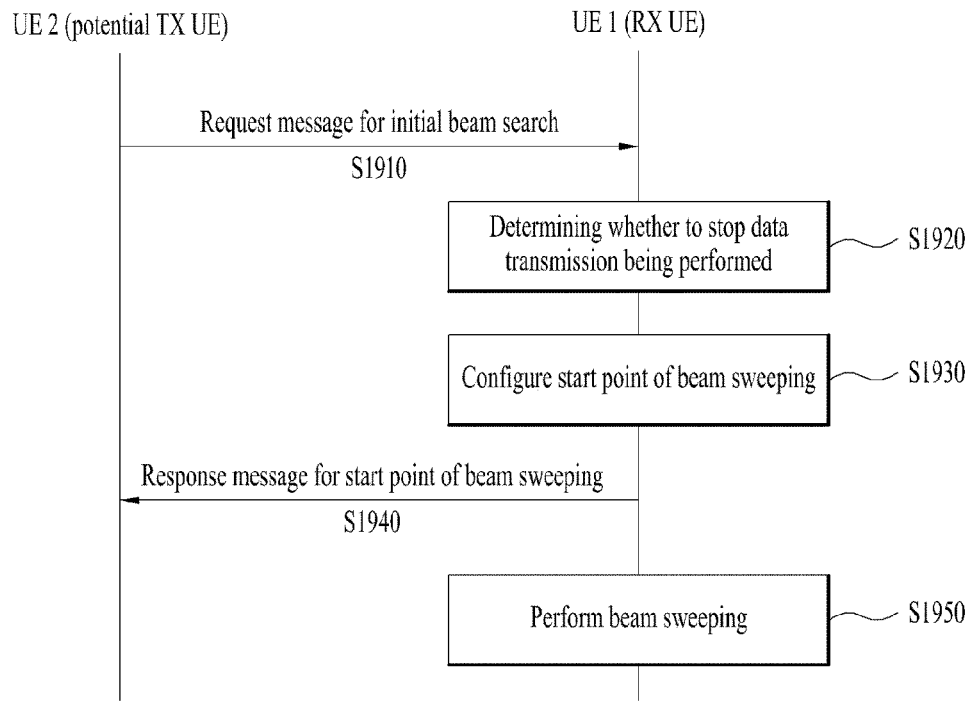

FIG. 19 is a flowchart for explaining a beam sweeping operation according to Method 2. A first UE (Rx UE) receives a request message for initial beam search for Tx/Rx beam acquisition from a second UE (potential Tx UE) while performing data transmission and reception (S1910). In this case, the request message may include information about a beam sweeping start point preferred by the second UE. Upon receiving the request message, the first UE determines whether to stop the current data transmission and reception by comparing the priority of the current data transmission and reception and the priority of data transmission and reception to be performed (S1920). When the first UE determines to stop the current data transmission and reception, the first UE may determine the point preferred by the second UE, a point preferred by the first UE, or a point suitable for the new data transmission and reception to a beam sweeping start point (S1930). After configuring the beam sweeping start point, the first UE transmits information about the beam sweeping start point to the second UE as a response message (S1940) and then performs beam sweeping at the corresponding point (S1950).

According to Method 2, the potential Tx UE may rapidly form a beam pair for new data transmission and reception with a high priority or tight latency requirements. However, it may be difficult to rapidly form a beam pair for new data transmission and reception with a low priority or less tight latency requirements.

Method 3. Method of Performing Beam Sweeping Using Residual Antenna Panel Among Multiple Antenna Panels In Method 3, it is assumed that a UE has multiple antenna panels. The UE with the multiple antenna panels may not only perform independent beam sweeping for each antenna panel but also form a beam pair for each antenna panel. In this case, the multiple antenna panels configured for the UE may be isolated spatially or independent from each other. For example, when two antenna panels: antenna panels #0 and #1 are configured for the UE, antenna panel #0 may be located at the front, and antenna panel #1 may be located at the rear.

Referring to FIG. 16, if an Rx UE uses only antenna panel #0 for data transmission and reception with a Tx UE, the Rx UE may receive a request message for initial beam search for Tx/Rx beam acquisition from a potential Tx UE. The request message for initial beam search may be a request message for beam search for new data transmission and reception.

While maintaining a link for current data transmission and reception on antenna panel #0, the Rx UE may perform beam search and beam sweeping only for antenna panel #1 which has no effects on the link on antenna panel #0. Alternatively, if there is a beam group mapped to the current data transmission and reception, the Rx UE may attempt to form a beam pair with the potential Tx UE using only candidates in the remaining beam groups except the corresponding beam group. The beam group mapped to the current data transmission and reception may be antenna panel #0, and the remaining beam groups except the corresponding beam group may be antenna panel #1.

Since the Rx UE searches for the beam pair in a limited candidate beam set, that is, within a limited number of antenna panels or candidate beams, the link quality of the formed beam pair may be poor compared to when the beam pair is searched for within all antenna panels or candidate beams. In this case, the Rx UE may perform the beam sweeping for the limited candidate beam set, measure the link quality thereof, and then determine whether to form the beam pair. For example, when the RSRP, SNR, or reference signal received quality (RSRQ) measurement value of the beam pair link is higher than a predetermined or signaled threshold, the Rx UE may form a new beam pair. When the RSRP, SNR, or RSRQ measurement value of the beam pair link is lower than the predetermined or signaled threshold, the Rx UE may not form any new beam pairs. When the measurement value is less than the threshold, the Rx UE may attempt the beam sweeping for all antenna panels or candidate beams according to Method 1 or 2. In other words, Method 3 may be applied together with Method 1 or 2.

Referring to FIG. 17, if an Rx UE uses only antenna panel #0 for data transmission and reception with a Tx UE, the Rx UE may receive a request message for initial beam search for Tx/Rx beam acquisition from the Tx UE. The request message for initial beam search may be a request message for beam search for new data transmission and reception. In this case, the Tx UE currently performing data transmission and reception may also act as a potential Tx UE that attempts new data transmission and reception.

While maintaining a link for the current data transmission and reception on antenna panel #0, the Rx UE may perform beam sweeping only for antenna panel #1 which has no effects on the link on antenna panel #0. Alternatively, if there is a beam group mapped to the current data transmission and reception, the Rx UE may attempt to form a beam pair for the new data transmission and reception using only candidates in the remaining beam groups except the corresponding beam group. The beam group mapped to the current data transmission and reception may be antenna panel #0, and the remaining beam groups except the corresponding beam group may be antenna panel #1.

Figure 20:
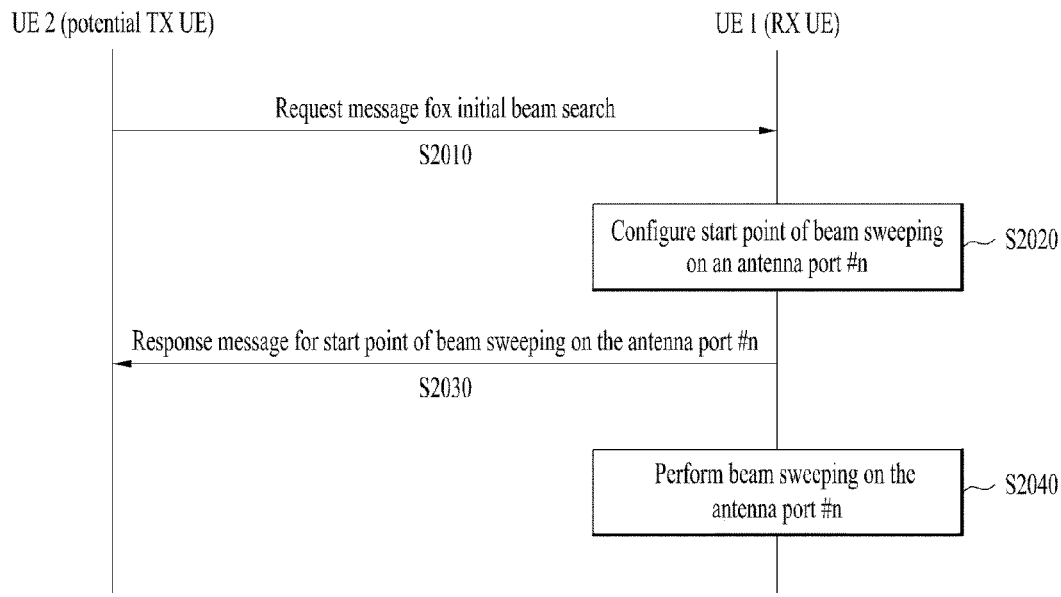

FIG. 20 is a flowchart for explaining a beam sweeping operation according to Method 3. A first UE (Rx UE) receives a request message for initial beam search for Tx/Rx beam acquisition from a second UE (potential Tx UE) while performing data transmission and reception (S2010). In this case, the request message may include information about a beam sweeping start point preferred by the second UE. Upon receiving the request message, the first UE configures a beam sweeping start point for a specific antenna port that is not used for the current data transmission and reception, antenna port #n by considering whether the beam sweeping start point preferred by the second UE is acceptable (S2020). The beam sweeping start point for antenna port #n may be the point preferred by the second UE, a point preferred by the first UE, or a point suitable for new data transmission and reception. After configuring the beam sweeping start point, the first UE transmits information about the beam sweeping start point to the second UE as a response message (S2030) and then performs beam sweeping at the corresponding point (S2040).

According to Method 3, the Rx UE may rapidly form a beam pair for new data transmission and reception with a high priority or tight latency requirements. In addition, the beam sweeping start point may be determined independently for each antenna or each candidate beam corresponding to each antenna, thereby achieving flexible beam sweeping. However, when the beam sweeping procedure is performed only for some limited antennas or candidate beams, it may be difficult to form the optimal beam pair. That is, only suboptimal beam pairs may be formed. Thus, when a beam pair is formed, performance degradation may occur.

The operations of Methods 1 to 3 may be performed not only separately but also together. For example, as described above in Method 3, a UE may measure the link quality of several antenna panels and perform beam sweeping. If the measured link quality is less than a threshold, the UE may perform the beam sweeping for all antenna panels according to Method 1 or 2. As another example, when a UE operating according to Method 1 or 2 has a plurality of antenna panels, the UE may exclude panels used for data transmission according to Method 1 or 2 and perform beam sweeping for the remaining panels according to Method 3.

In Methods 1 to 3, an Rx UE performing beam sweeping may transmit and receive multiple data on multiple beams or based on TDM in order to exchange the multiple data with one or a plurality of UEs.

The operations of Methods 1 to 3 have been described on the assumption that an Rx UE currently forming a link or transmitting and receiving services/data receives a request message for beam search and configures a beam sweeping start point for convenience of description. However, if there is a specific header UE having full control over other UEs, the operations of Methods 1 to 3 may be performed by the header UE rather than the Rx UE (other-UE controlled scenario).

Further, the operations of Methods 1 to 3 have been described based on that beam search is requested for new data transmission and reception, the operations may be similarly applied when beam refinement is requested rather than the beam search.

Configuration of Message 1 and Message 2 for Beam Search Request and Response

To support the operations of Methods 1 to 3, Message 1 (Msg. 1) for initial beam search for Tx/Rx beam acquisition may be configured as follows. Msg. 1 is equivalent to the request message of Methods 1 to 3 described above.

Msg. 1 transmission is not limited by signals or channels. For example, Msg. 1 may be transmitted in signals or channels over a part or the entirety of a synchronization signal block (SSB) including a PSS, an SSS, or a physical sidelink broadcast channel (PSBCH). For example, Msg. 1 may be transmitted as a part or all of control information over a PSCCH or a feedback channel In another example, Msg. 1 may be transmitted as a part or all of data over a PSSCH. In a further example, Msg. 1 may be transmitted in the form of a preamble or an RS such as a CSI-RS, a DM-RS, etc. A signal carrying Msg. 1 may be transmitted in a relatively low frequency band, for example, 5. 9 GHz.

Msg. 1 may further include not only information about a beam search triggering indicator and/or a source or destination ID of a Tx UE but also information required for beam sweeping. For example, Msg. 1 may include information about a service ID of data to be exchanged and/or information about PPPP and/or latency requirements of the data. In another example, Msg. 1 may include information about a beam sweeping start point or period preferred by the Tx UE.

To support the operations of Methods 1 to 3 proposed above, Message 2 (Msg. 2) for initial beam search for Tx/Rx beam acquisition may be configured as follows. Msg. 2 is equivalent to the response message of Methods 1 to 3 described above.

Msg. 2 transmission is not limited by signals or channels. For example, Msg. 2 may be transmitted in signals or channels over a part or the entirety of a synchronization signal block (SSB) including a PSS, an SSS, or a PSBCH. For example, Msg. 2 may be transmitted as a part or all of control information over a PSCCH or a feedback channel In another example, Msg. 2 may be transmitted as a part or all of data over a PSSCH. In a further example, Msg. 2 may be transmitted in the form of a preamble or an RS such as a CSI-RS, a DM-RS, etc. A signal carrying Msg. 2 may be transmitted in a relatively low frequency band, for example, 5. 9 GHz.

Msg. 2 may further include not only information about an acknowledgement indicator and information about whether a beam sweeping request is accepted but also information required for beam sweeping. For example, when Msg. 1 includes information about a beam sweeping start point or period preferred by a Tx UE, Msg. 2 may include information about whether the beam sweeping start point or period preferred by the Tx UE is accepted. When Msg. 1 does not contain the information about the beam sweeping start point or period preferred by the Tx UE, Msg. 2 may include information about a beam sweeping start point or period preferred by an Rx UE. When Msg. 2 contains the information about the beam sweeping start point or period preferred by the Rx UE, the Tx UE may no longer transmit the information about its preferred beam sweeping start point or period but perform the beam sweeping based on the beam sweeping start point or period preferred by the Rx UE.

Communication Systems and Devices to which Present Disclosure is Applicable

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
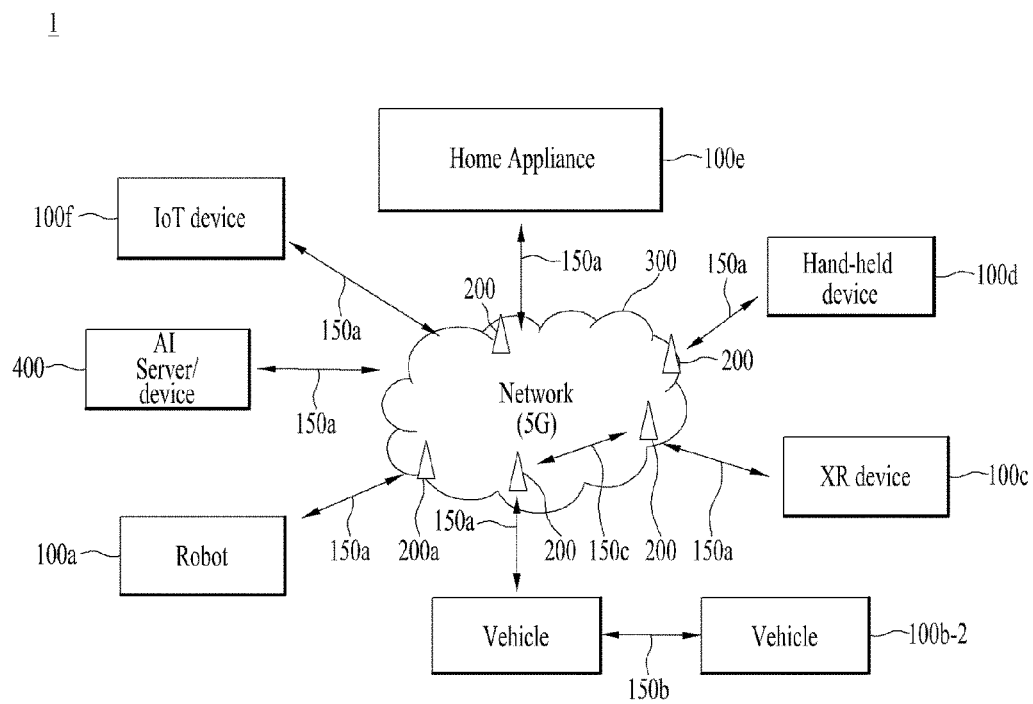
FIGS. 21 to 26 are diagrams illustrating various devices to which embodiment(s) are applicable.

FIG. 21 illustrates a communication system 1 applied to the present disclosure.

Referring to FIG. 21, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smart meter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
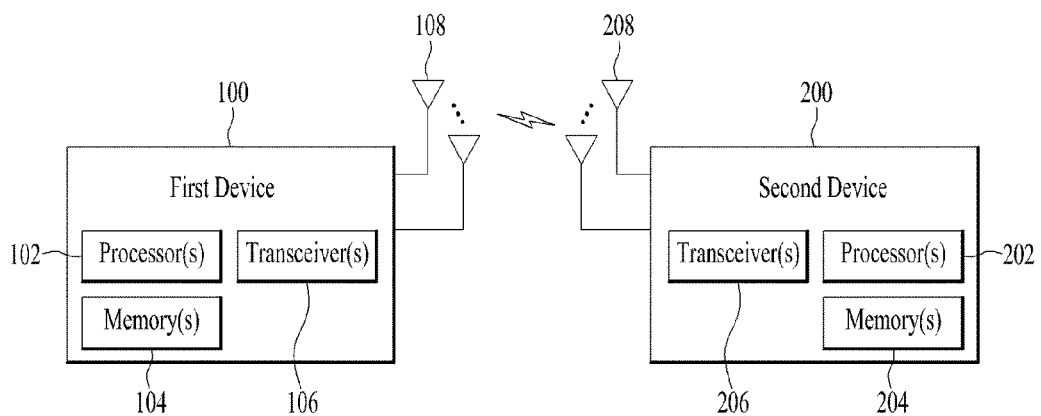

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
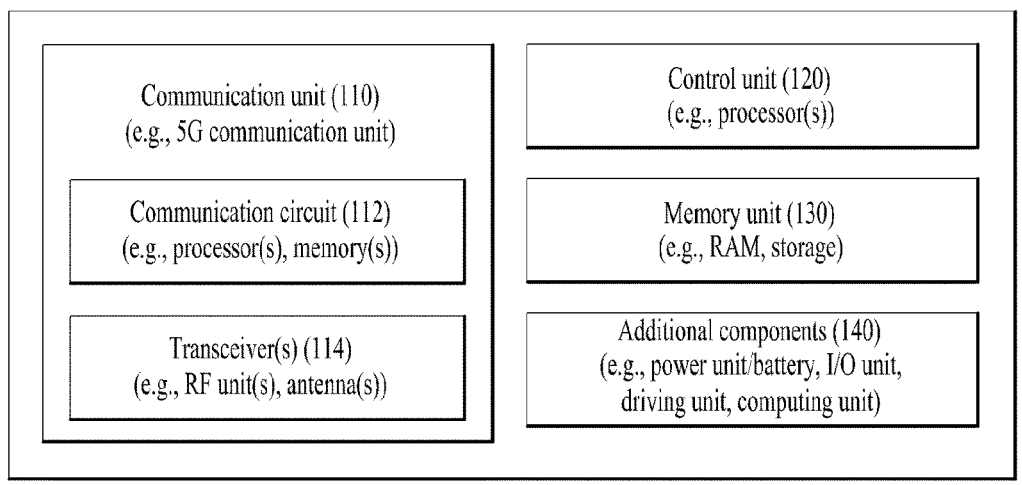

FIG. 23 illustrates another example of a wireless device applicable to the present disclosure. The wireless device may be implemented in various forms depending on use-cases/services (see FIG. 21).

Referring to FIG. 23, wireless devices 100 and 200 may correspond to the wireless devices 100 and 200 of FIG. 12 and include various elements, components, units, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls the overall operation of each wireless device. For example, the control unit 120 may be control the electric/mechanical operation of each wireless device based on programs/code/commands/information stored in the memory unit 130. The control unit 120 may transmit the information stored in the memory unit 130 to the outside (e.g., other communication devices) through the communication unit 110 over a wireless/wired interface. Further, the control unit 120 may store information received from the outside (e.g., other communication devices) through the communication unit 110 over the wireless/wired interface in the memory unit 130.

The additional components 140 may vary according to types of the wireless device. For example, the additional components 140 may include at least one of a power unit/battery, input/output (I/O) unit, a driving unit, and a computing unit. The wireless device may be implemented in the form of the robot 100a (FIG. 21), the vehicles 100 b-1 and 100 b-2 (FIG. 21), the XR device 100c (FIG. 21), the hand-held device 100d (FIG. 21), the home appliance 100e (FIG. 21), the IoT device 100f (FIG. 21), a digital broadcast terminal, a hologram device, a public safety device, an MTC device, a medicine device, a FinTech device (or finance device), a security device, a climate/environment device, the AI server/device 400 (FIG. 21), the BSs 200 (FIG. 21), a network node, etc. However, the wireless device is not limited thereto. The wireless device may be used in a mobile or fixed place depending on use-cases/services.

In FIG. 23, all of the various elements, components, units/portions, and/or modules in the wireless devices 100 and 200 may be connected to each other over a wired interface or at least a part thereof may be wirelessly connected through the communication unit 110. For example, in each of the wireless devices 100 and 200, the control unit 120 and the communication unit 110 may be connected by wire, and the control unit 120 and first units (e.g., 130, 140) may be wirelessly connected through the communication unit 110. Each element, component, unit/portion, and/or module of the wireless devices 100 and 200 may further include one or more elements. For example, the control unit 120 may be implemented with a set of one or more processors. In one example, the control unit 120 may be implemented with a set of a communication control processor, an application processor, an electronic control unit (ECU), a graphical processing unit, and a memory control processor. In another example, the memory 130 may be implemented with a random access memory (RAM), a dynamic RAM (DRAM), a read-only memory (ROM), a flash memory, a volatile memory, a non-volatile memory, and/or any combination thereof.

Figure 24:
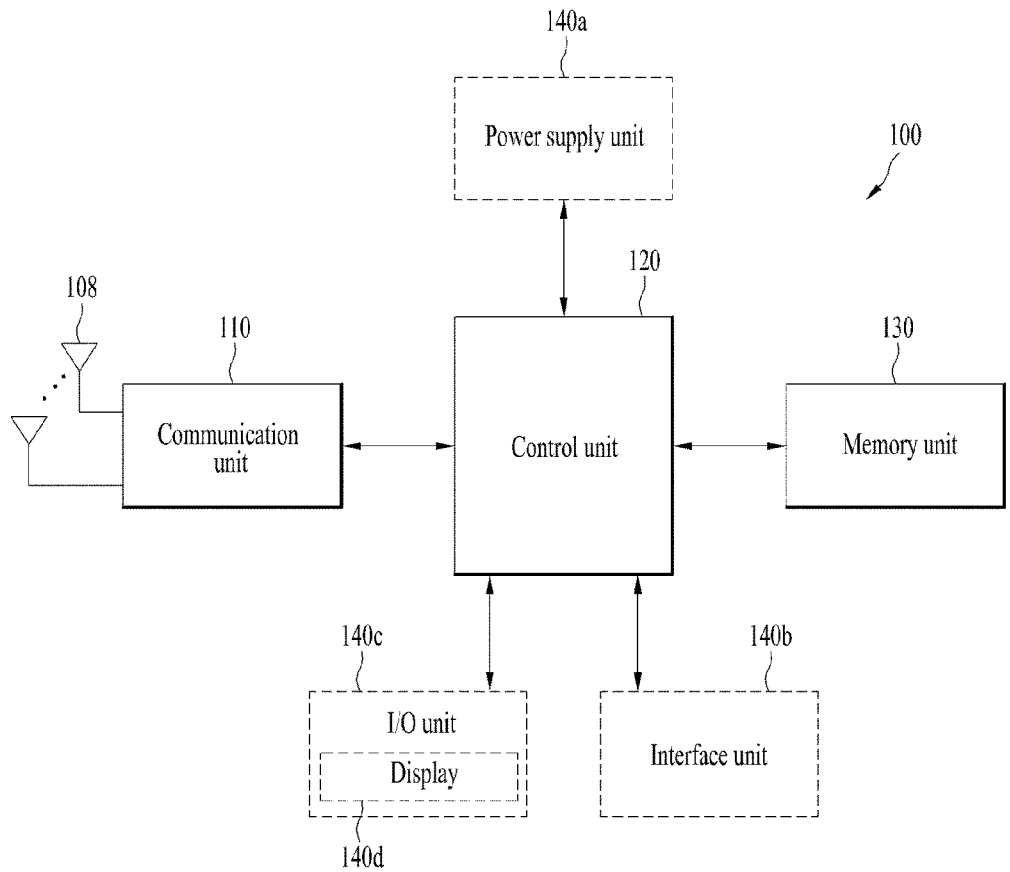

FIG. 24 illustrates a hand-held device applicable to the present disclosure. The hand-held device may include a smartphone, a smartpad, a wearable device (e.g., smartwatch or smartglasses), or a portable computer (e.g., laptop). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be implemented as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices and/or BSs. The control unit 120 may perform various operations by controlling components of the hand-held device 100. The control unit 120 may include an application processor (AP). The memory unit 130 may store data/parameters/programs/code/commands required to drive the hand-held device 100. The memory unit 130 may store input/output data/information. The power supply unit 140a may supply power to the hand-held device 100 and include a wired/wireless charging circuit, a battery, etc. The interface unit 140b may support connections between the hand-held device 100 and other external devices. The interface unit 140b may include various ports (e.g., audio I/O port, video I/O port, etc.) for the connections with the external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in data communication, the I/O unit 140c may obtain information/signals (e.g., touch, text, voice, image, video, etc.) input by a user, and the obtained information/signals may be stored in the memory unit 130. The communication unit 110 may convert the information/signals stored in the memory unit 130 into radio signals and transmit the converted radio signals to another wireless device directly or to a BS. The communication unit 110 may receive radio signals from the other wireless device or the BS and restore the received radio signals to original information/signals. The restored information/signals may be stored in the memory unit 130 and output in various forms (e.g., text, voice, images, video, haptic, etc.) through the I/O unit 140c.

Figure 25:
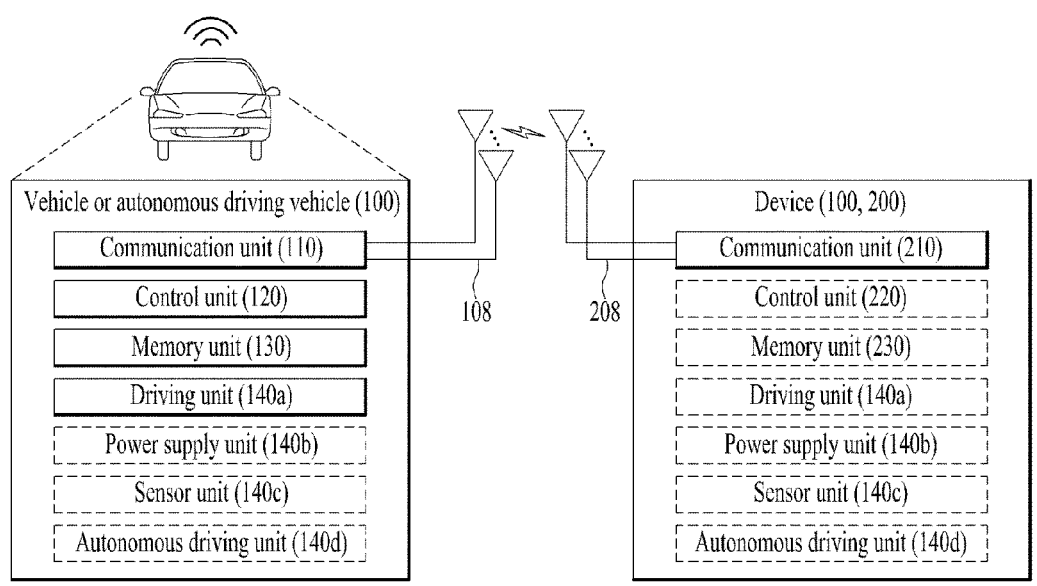

FIG. 25 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 26:
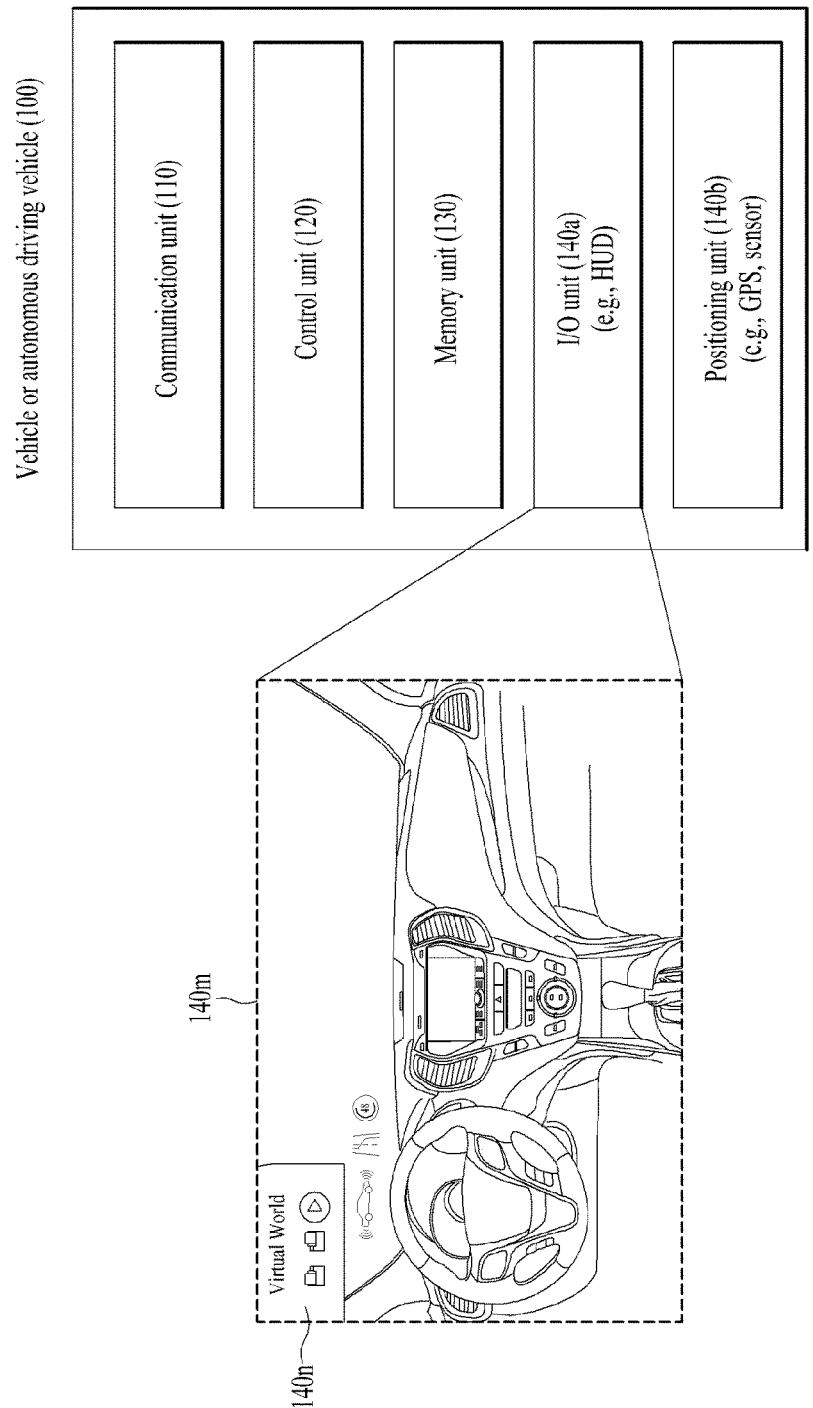

FIG. 26 illustrates a vehicle applied to the present disclosure. The vehicle may be implemented as a transport means, an aerial vehicle, a ship, etc.

Referring to FIG. 26, a vehicle 100 may include a communication unit 110, a control unit 120, a memory unit 130, an I/O unit 140a, and a positioning unit 140b.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

The above-described embodiments are combinations of elements and features of the present disclosure in prescribed forms. The elements or features may be considered as selective unless specified otherwise. Each element or feature may be implemented without being combined with other elements or features. Further, the embodiment of the present disclosure may be constructed by combining some of the elements and/or features. The order of the operations described in the embodiments of the present disclosure may be modified. Some configurations or features of any one embodiment may be included in another embodiment or replaced with corresponding configurations or features of the other embodiment. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

Although the method of performing beam sweeping by a terminal supporting sidelink in a wireless communication system and terminal therefor have been described based on 3GPP LTE/LTE-A and NR, the method and terminal are applicable to various wireless communication systems including 3GPP LTE/LTE-A and NR.

The invention claimed is:

1. A method of performing beam sweeping by a first user equipment (UE) supporting sidelink in a wireless communication system, the method comprising:
receiving from a second UE a request message for initial beam search for first data transmission;
determining whether to discontinue second data transmission currently performed by the first UE based on a priority of the first data transmission and a priority of the second data transmission;
transmitting to the second UE a response message including information about a start point of beam sweeping for the second UE based on whether the second data transmission is discontinued; and
performing the beam sweeping for the second UE based on the start point of the beam sweeping.

2. The method of claim 1, wherein based on that the priority of the first data transmission is higher than the priority of the second data transmission, the second data transmission is discontinued.

3. The method of claim 1, wherein based on that latency requirements of the first data transmission are not satisfied, the second data transmission is discontinued.

4. The method of claim 1, wherein based on that a link quality measurement value of the second data transmission is smaller than a threshold, the second data transmission is discontinued.

5. The method of claim 1, wherein the request message includes information about the priority of the first data transmission and information about a first start point preferred by the second UE.

6. The method of claim 5, wherein based on that the first start point is acceptable, the first start point is set to the start point of the beam sweeping, and wherein based on that the first point is unacceptable, a second start point preferred by the first UE is set to the start point of the beam sweeping.

7. The method of claim 1, wherein the response message further includes information about a pattern for performing the beam sweeping, and wherein the beam sweeping is performed based on the pattern.

8. The method of claim 1, wherein the request message is received in a frequency band below 6 GHz, and wherein the second data transmission is performed in a frequency band of 6 GHz or higher.

9. The method of claim 1, wherein the first UE has a plurality of antenna panels, and wherein the second data transmission is performed on a first antenna panel among the plurality of antenna panels.

10. The method of claim 9, wherein the beam sweeping is performed for candidate beams of a second antenna panel among the plurality of antenna panels, and wherein the second antenna panel is spatially isolated from the first antenna panel.

11. The method of claim 10, wherein based on that reference signal received power (RSRP) of the beam sweeping for the candidate beams of the second antenna panel is smaller than a threshold, the beam sweeping is performed for candidate beams of the first antenna panel.

12. The method of claim 1, wherein the first UE communicates with at least one of an autonomous driving vehicle, a base station, a network, or UEs other than the first UE.

13. A first user equipment (UE) for performing beam sweeping and supporting sidelink in a wireless communication system, the first UE comprising:
a transceiver configured to transmit a signal; and at least one processor configured to control the transceiver,
wherein the at least one processor is configured to:
control the transceiver to receive from a second UE a request message for initial beam search for first data transmission;
determine whether to discontinue second data transmission currently performed by the first UE based on a priority of the first data transmission and a priority of the second data transmission;
control the transceiver to transmit to the second UE a response message including information about a start point of beam sweeping for the second UE based on whether the second data transmission is discontinued; and
perform the beam sweeping for the second UE based on the start point of the beam sweeping.

14. A first device for performing beam sweeping and supporting sidelink in a wireless communication system, the first device comprising:
a memory; and
at least one processor connected to the memory,
wherein the at least one processor is configured to:
receive from a second device a request message for initial beam search for first data transmission;
determine whether to discontinue second data transmission currently performed by the first device based on a priority of the first data transmission and a priority of the second data transmission;
transmit to the second device a response message including information about a start point of beam sweeping for the second device based on whether the second data transmission is discontinued; and
perform the beam sweeping for the second device based on the start point of the beam sweeping.

* * * * *